US010673950B2

(12) United States Patent
Pereira Cabral

(10) Patent No.: US 10,673,950 B2
(45) Date of Patent: Jun. 2, 2020

(54) SYSTEMS AND METHODS FOR SETUP, CONTROL, AND TEST OF VIRTUAL MOBILE ACCESS POINT OPERATION IN A NETWORK OF MOVING THINGS

(71) Applicant: Veniam, Inc., Mountain View, CA (US)

(72) Inventor: Henrique Manuel Pereira Cabral, Matosinhos (PT)

(73) Assignee: Veniam, Inc., Mountain View, CA (US)

( * ) Notice: Subject to any disclaimer, the term of this patent is extended or adjusted under 35 U.S.C. 154(b) by 266 days.

(21) Appl. No.: 15/809,402

(22) Filed: Nov. 10, 2017

(65) Prior Publication Data

US 2018/0191828 A1 Jul. 5, 2018

Related U.S. Application Data

(60) Provisional application No. 62/442,053, filed on Jan. 4, 2017.

(51) Int. Cl.
*G06F 15/16* (2006.01)
*H04L 29/08* (2006.01)
*H04L 12/26* (2006.01)
*H04W 88/08* (2009.01)

(52) U.S. Cl.
CPC .............. *H04L 67/12* (2013.01); *H04L 43/08* (2013.01); *H04L 43/50* (2013.01); *H04W 88/08* (2013.01)

(58) Field of Classification Search
CPC ......... H04L 67/12; H04L 43/50; H04L 43/08; H04W 88/08
USPC .......................... 709/202–203, 217–219, 250
See application file for complete search history.

(56) References Cited

U.S. PATENT DOCUMENTS

| | | | | |
|---|---|---|---|---|
| 7,437,479 B2* | 10/2008 | Ishiyama | ................ | H04W 8/02 709/217 |
| 8,027,937 B1* | 9/2011 | Bartholomay | ...... | H04L 41/5064 709/203 |
| 8,843,837 B2* | 9/2014 | Jeyabalan | ............... | H04L 41/22 709/227 |
| 9,426,093 B2* | 8/2016 | Olsson | .................. | H04L 12/185 |
| 10,264,425 B2* | 4/2019 | de Azevedo | ............ | H04L 43/50 |
| 2006/0212540 A1* | 9/2006 | Chon | ...................... | H04L 67/12 709/218 |
| 2012/0089684 A1* | 4/2012 | Angus | ..................... | H04L 67/12 709/218 |
| 2019/0090174 A1 | 3/2019 | Rocci et al. | | |

\* cited by examiner

*Primary Examiner* — Bharat Barot
(74) *Attorney, Agent, or Firm* — McAndrews, Held & Malloy, Ltd.

(57) ABSTRACT

Communication network architectures, systems and methods for supporting a network of mobile nodes. As a non-limiting example, various aspects of this disclosure provide communication network architectures, systems, and methods for supporting a dynamically configurable communication network comprising a complex array of both static and moving communication nodes (e.g., the Internet of moving things).

21 Claims, 13 Drawing Sheets

SYSTEMS AND METHODS FOR SETUP, CONTROL, AND TEST OF VIRTUAL MOBILE ACCESS POINT OPERATION IN A NETWORK OF MOVING THINGS

CROSS-REFERENCE TO RELATED APPLICATIONS/INCORPORATION BY REFERENCE

This patent application makes reference to, claims priority to, and claims benefit from U.S. Provisional Patent Application Ser. No. 62/442,053, filed on Jan. 4, 2017, and titled "Systems and Methods for Setup, Control, and Test of Virtual Mobile Access Point Operation in a Network of Moving Things," each of which is hereby incorporated herein by reference in its entirety. The present application is also related to U.S. Provisional Application Ser. No. 62/221,997, titled "Integrated Communication Network for a Network of Moving Things," filed on Sep. 22, 2015; U.S. Provisional Application Ser. No. 62/222,016, titled "Systems and Methods for Synchronizing a Network of Moving Things," filed on Sep. 22, 2015; U.S. Provisional Application Ser. No. 62/222,042, titled "Systems and Methods for Managing a Network of Moving Things," filed on Sep. 22, 2015; U.S. Provisional Application Ser. No. 62/222,066, titled "Systems and Methods for Monitoring a Network of Moving Things," filed on Sep. 22, 2015; U.S. Provisional Application Ser. No. 62/222,077, titled "Systems and Methods for Detecting and Classifying Anomalies in a Network of Moving Things," filed on Sep. 22, 2015; U.S. Provisional Application Ser. No. 62/222,098, titled "Systems and Methods for Managing Mobility in a Network of Moving Things," filed on Sep. 22, 2015; U.S. Provisional Application Ser. No. 62/222,121, titled "Systems and Methods for Managing Connectivity a Network of Moving Things," filed on Sep. 22, 2015; U.S. Provisional Application Ser. No. 62/222,135, titled "Systems and Methods for Collecting Sensor Data in a Network of Moving Things," filed on Sep. 22, 2015; U.S. Provisional Application Ser. No. 62/222,145, titled "Systems and Methods for Interfacing with a Network of Moving Things," filed on Sep. 22, 2015; U.S. Provisional Application Ser. No. 62/222,150, titled "Systems and Methods for Interfacing with a User of a Network of Moving Things," filed on Sep. 22, 2015; U.S. Provisional Application Ser. No. 62/222,168, titled "Systems and Methods for Data Storage and Processing for a Network of Moving Things," filed on Sep. 22, 2015; U.S. Provisional Application Ser. No. 62/222,183, titled "Systems and Methods for Vehicle Traffic Management in a Network of Moving Things," filed on Sep. 22, 2015; U.S. Provisional Application Ser. No. 62/222,186, titled "Systems and Methods for Environmental Management in a Network of Moving Things," filed on Sep. 22, 2015; U.S. Provisional Application Ser. No. 62/222,190, titled "Systems and Methods for Port Management in a Network of Moving Things," filed on Sep. 22, 2015; U.S. Provisional Patent Application Ser. No. 62/222,192, titled "Communication Network of Moving Things," filed on Sep. 22, 2015; U.S. Provisional Application Ser. No. 62/244,828, titled "Utilizing Historical Data to Correct GPS Data in a Network of Moving Things," filed on Oct. 22, 2015; U.S. Provisional Application Ser. No. 62/244,930, titled "Using Anchors to Correct GPS Data in a Network of Moving Things," filed on Oct. 22, 2015; U.S. Provisional Application Ser. No. 62/246,368, titled "Systems and Methods for Inter-Application Communication in a Network of Moving Things," filed on Oct. 26, 2015; U.S. Provisional Application Ser. No. 62/246,372, titled "Systems and Methods for Probing and Validating Communication in a Network of Moving Things," filed on Oct. 26, 2015; U.S. Provisional Application Ser. No. 62/250,544, titled "Adaptive Rate Control for Vehicular Networks," filed on Nov. 4, 2015; U.S. Provisional Application Ser. No. 62/273,878, titled "Systems and Methods for Reconfiguring and Adapting Hardware in a Network of Moving Things," filed on Dec. 31, 2015; U.S. Provisional Application Ser. No. 62/253,249, titled "Systems and Methods for Optimizing Data Gathering in a Network of Moving Things," filed on Nov. 10, 2015; U.S. Provisional Application Ser. No. 62/257,421, titled "Systems and Methods for Delay Tolerant Networking in a Network of Moving Things," filed on Nov. 19, 2015; U.S. Provisional Application Ser. No. 62/265,267, titled "Systems and Methods for Improving Coverage and Throughput of Mobile Access Points in a Network of Moving Things," filed on Dec. 9, 2015; U.S. Provisional Application Ser. No. 62/270,858, titled "Channel Coordination in a Network of Moving Things," filed on Dec. 22, 2015; U.S. Provisional Application Ser. No. 62/257,854, titled "Systems and Methods for Network Coded Mesh Networking in a Network of Moving Things," filed on Nov. 20, 2015; U.S. Provisional Application Ser. No. 62/260,749, titled "Systems and Methods for Improving Fixed Access Point Coverage in a Network of Moving Things," filed on Nov. 30, 2015; U.S. Provisional Application Ser. No. 62/273,715, titled "Systems and Methods for Managing Mobility Controllers and Their Network Interactions in a Network of Moving Things," filed on Dec. 31, 2015; U.S. Provisional Application Ser. No. 62/281,432, titled "Systems and Methods for Managing and Triggering Handovers of Mobile Access Points in a Network of Moving Things," filed on Jan. 21, 2016; U.S. Provisional Application Ser. No. 62/268,188, titled "Captive Portal-related Control and Management in a Network of Moving Things," filed on Dec. 16, 2015; U.S. Provisional Application Ser. No. 62/270,678, titled "Systems and Methods to Extrapolate High-Value Data from a Network of Moving Things," filed on Dec. 22, 2015; U.S. Provisional Application Ser. No. 62/272,750, titled "Systems and Methods for Remote Software Update and Distribution in a Network of Moving Things," filed on Dec. 30, 2015; U.S. Provisional Application Ser. No. 62/278,662, titled "Systems and Methods for Remote Configuration Update and Distribution in a Network of Moving Things," filed on Jan. 14, 2016; U.S. Provisional Application Ser. No. 62/286,243, titled "Systems and Methods for Adapting a Network of Moving Things Based on User Feedback," filed on Jan. 22, 2016; U.S. Provisional Application Ser. No. 62/278,764, titled "Systems and Methods to Guarantee Data Integrity When Building Data Analytics in a Network of Moving Things," Jan. 14, 2016; U.S. Provisional Application Ser. No. 62/286,515, titled "Systems and Methods for Self-Initialization and Automated Bootstrapping of Mobile Access Points in a Network of Moving Things," filed on Jan. 25, 2016; U.S. Provisional Application Ser. No. 62/295,602, titled "Systems and Methods for Power Management in a Network of Moving Things," filed on Feb. 16, 2016; and U.S. Provisional Application Ser. No. 62/299,269, titled "Systems and Methods for Automating and Easing the Installation and Setup of the Infrastructure Supporting a Network of Moving Things," filed on Feb. 24, 2016; each of which is hereby incorporated herein by reference in its entirety for all purposes.

BACKGROUND

Current communication networks are unable to adequately support communication environments involving mobile and static nodes. As a non-limiting example, current communication networks are unable to adequately support a network comprising a complex array of both moving and static nodes (e.g., the Internet of moving things, autonomous vehicle networks, etc.). Limitations and disadvantages of conventional methods and systems will become apparent to one of skill in the art, through comparison of such approaches with some aspects of the present methods and systems set forth in the remainder of this disclosure with reference to the drawings.

SUMMARY

Figure 1:
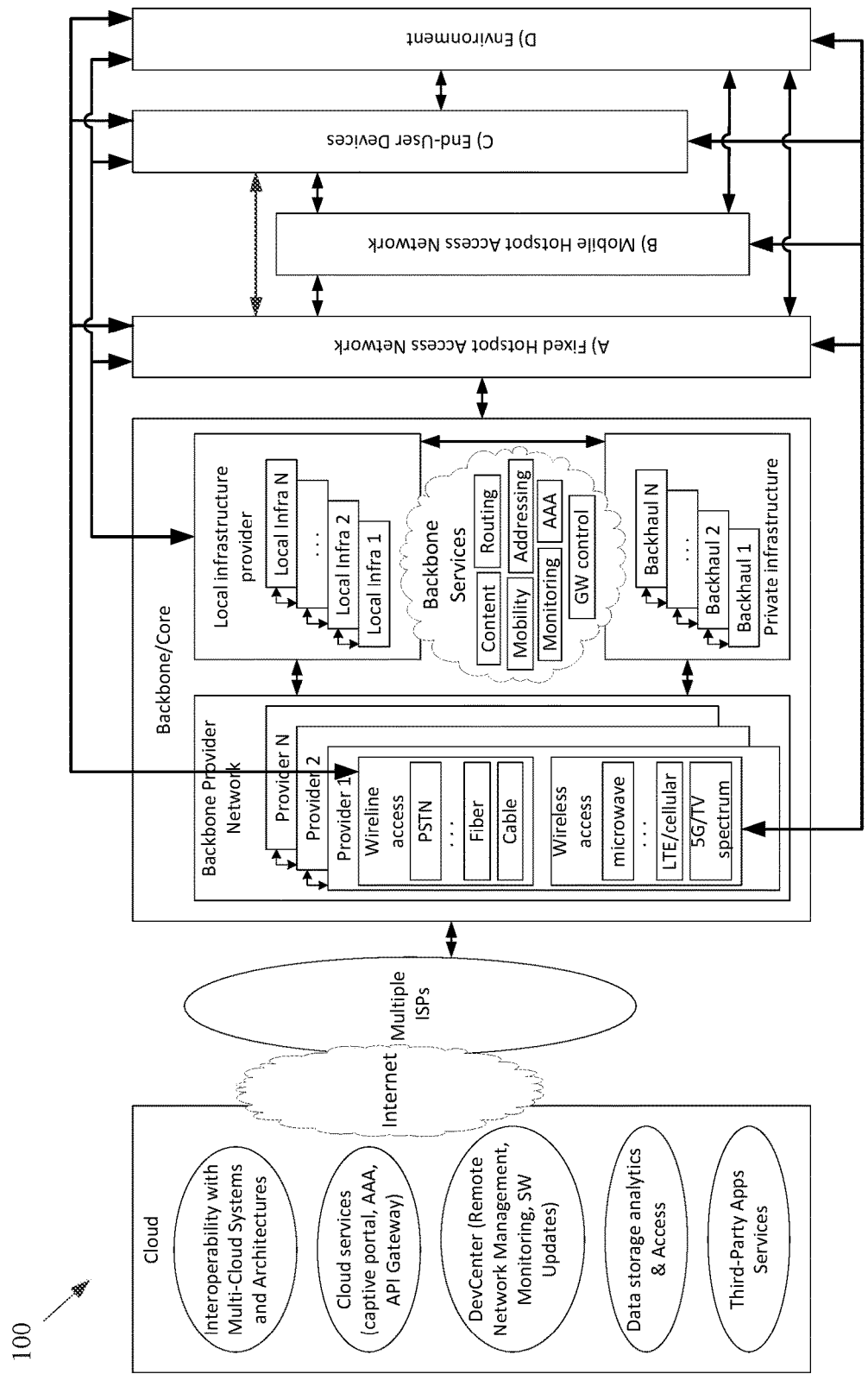
FIG. 1 shows a block diagram of a communication network, in accordance with various aspects of this disclosure.

Various aspects of this disclosure provide communication network architectures, systems and methods for supporting a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (i.e., hardware) and any software and/or firmware ("code") that may configure the hardware, be executed by the hardware, and or otherwise be associated with the hardware.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or z" means "one or more of x, y, and z." As utilized herein, the terms "e.g.," and "for example," "exemplary," and the like set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments may, for example, include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform may, for example, operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform may, for example, be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters may, for example, be derived locally, gathered from a neighborhood, fixed APs, the Cloud, etc. Various aspects of the platform may also, for example, ask for historical information to feed any of the decisions, where such information can be derived from historical data, from surveys, from simulators, etc. Various aspects of the platform may additionally, for example, probe or monitor decisions made throughout the network, for example to evaluate the network and/or the decisions themselves in real-time. Various aspects of the platform may further, for example, enforce the decisions in the network (e.g., after evaluating the probing results). Various aspects of the platform may, for example, establish thresholds to avoid any decision that is to be constantly or repeatedly performed without any significant advantage (e.g., technology change, certificate change, IP change, etc.). Various aspects of the platform may also, for example, learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not be performed by the particular example subsystem or by a single subsystem. For example, the subsystems present herein may interact with each other, and data or control services may be deployed either in a centralized way, or having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization may, for example, provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to effectively expand their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, Mobile AP, MAP, etc. The OBU may, for example, comprise a plurality of networking interfaces (e.g., Wi-Fi, 802.11p, 4G, Bluetooth, UWB, etc.). The OBU may, for example, be readily installed in or on private and/or public vehicles (e.g., individual user vehicles, vehicles of private fleets, vehicles of public fleets, etc.). The OBU may, for example, be installed in transportation fleets, waste management fleets, law enforcement fleets, emergency services, road maintenance fleets, taxi fleets, aircraft fleets, etc. The OBU may, for example, be installed in or on a vehicle or other structure with free mobility or relatively limited mobility. The OBU may also, for example, be carried by a person or service animal, mounted to a bicycle, mounted to a moving machine in general, mounted to a container, etc.

The OBUs may, for example, operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets may, for example, form an overall mesh of communication links, for example including the OBUs and also fixed Access Points (APs) connected to the wired infrastructure (e.g., a local infrastructure, etc.). Note that OBUs herein may also be referred to as "Mobile APs," "mobile hotspots," "MAPs," etc. Also note that fixed access points may also be referred to herein as Road Side Units (RSUs), Fixed APs, FAPs, etc.

In an example implementation, the OBUs may communicate with the Fixed APs utilizing a relatively long-range protocol (e.g., 802.11p, etc.), and the Fixed APs may, in turn, be hard wired to the wired infrastructure (e.g., via cable, tethered optical link, etc.). Note that Fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU may, for example, comprise a robust vehicular networking module (e.g., a connection manager) which builds on long-range communication protocol capability (e.g., 802.11p, etc.). For example, in addition to comprising 802.11p (or other long-range protocol) capability to communicate with Fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a Fixed AP, may be utilized to provide a fail-over communication link, may be utilized for emergency communications, may be utilized to subscribe to local infrastructure access, etc. The cellular network interface may also, for example, be utilized to allow the deployment of solutions that are dependent on the cellular network operators.

An OBU, in accordance with various aspects of the present disclosure, may for example comprise a smart connection manager that can select the best available wireless link(s) (e.g., Wi-Fi, 802.11p, cellular, vehicle mesh, etc.) with which to access the Internet. The OBU may also, for example, provide geo-location capabilities (e.g., GPS, etc.), motion detection sensors to determine if the vehicle is in motion, and a power control subsystem (e.g., to ensure that the OBU does not deplete the vehicle battery, etc.). The OBU may, for example, comprise any or all of the sensors (e.g., environmental sensors, etc.) discussed herein.

The OBU may also, for example, comprise a manager that manages machine-to-machine data acquisition and transfer (e.g., in a real-time or delay-tolerant fashion) to and from the cloud. For example, the OBU may log and/or communicate information of the vehicles.

The OBU may, for example, comprise a connection and/or routing manager that operates to perform routing of communications in a vehicle-to-vehicle/vehicle-to-infrastructure multi-hop communication. A mobility manager (or controller, MC) may, for example, ensure that communication sessions persist over one or more handoff(s) (also referred to herein as a "handover" or "handovers") (e.g., between different Mobile APs, Fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a Fixed AP (or distributed system thereof), as part of an OBU (or a distributed system thereof), etc. Various non-limiting examples of system components and/or methods are provided in U.S. Provisional Application No. 62/222,098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

Various aspects of the present disclosure also provide a cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure may, for example, support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a Mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof) may, for example, be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU may, for example, process the data in any manner deemed advantageous by the system. The OBU may, for example, send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU may, for example, be operable to communicate with any of a variety of Wi-Fi-enabled sensor devices equipped with a heterogeneous collection of environmental sensors. Such sensors may, for example, comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors may, for example, comprise sensors and/or systems associated with on-board diagnostic (OBD) units for vehicles, autonomous vehicle driving systems, etc. Such sensors may, for example, comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors may, for example, comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to periodically communicate with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the Mobile AP (e.g., vehicle-mounted sensors). Note that the sensor may also (or alternatively) be mobile (e.g., a sensor mounted to another vehicle passing by a Mobile AP or Fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities may, for example, quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Also, the example network 100 may, for example, share any or all characteristics with the other example methods, systems, networks and/or network components 200, 300, 400, 500-570, and 600, discussed herein.

The example network 100, for example, comprises a Cloud that may, for example comprise any of a variety of network level components. The Cloud may, for example, comprise any of a variety of server systems executing applications that monitor and/or control components of the network 100. Such applications may also, for example, manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud may, for example, manage interoperability with various multi-cloud systems and architectures. Another example component (e.g., a Cloud service component) may, for example, provide various cloud services (e.g., captive portal services, authentication, authorization, and accounting (AAA) services, API Gateway services, etc.). An additional example component (e.g., a DevCenter component) may, for example, provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud may, for example, be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core may, for example, comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core may also, for example, comprise one or more Local Infrastructure Providers. The Backbone/Core may also, for example, comprise a private infrastructure (e.g., run by the network 100 implementer, owner, etc.). The Backbone/Core may, for example, provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core may, for example, comprise and/or interface with different Authentication, Authorization, and Accounting (AAA) mechanisms.

The Backbone/Core Infrastructure may, for example, support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., Mobile APs or OBUs (On Board Units), Fixed APs or RSUs (Road Side Units), MCs (Mobility Controllers) or LMAs (Local Mobility Anchors) or Network Controllers, etc.) and/or third-party systems.

The Backbone/Core Infrastructure may, for example, comprise the ability to utilize and/or interface with different data storage/processing systems (e.g., MongoDB, MySql, Redis, etc.). The Backbone/Core Infrastructure may further, for example, provide different levels of simultaneous access to the infrastructure, services, data, etc.

Figure 2:
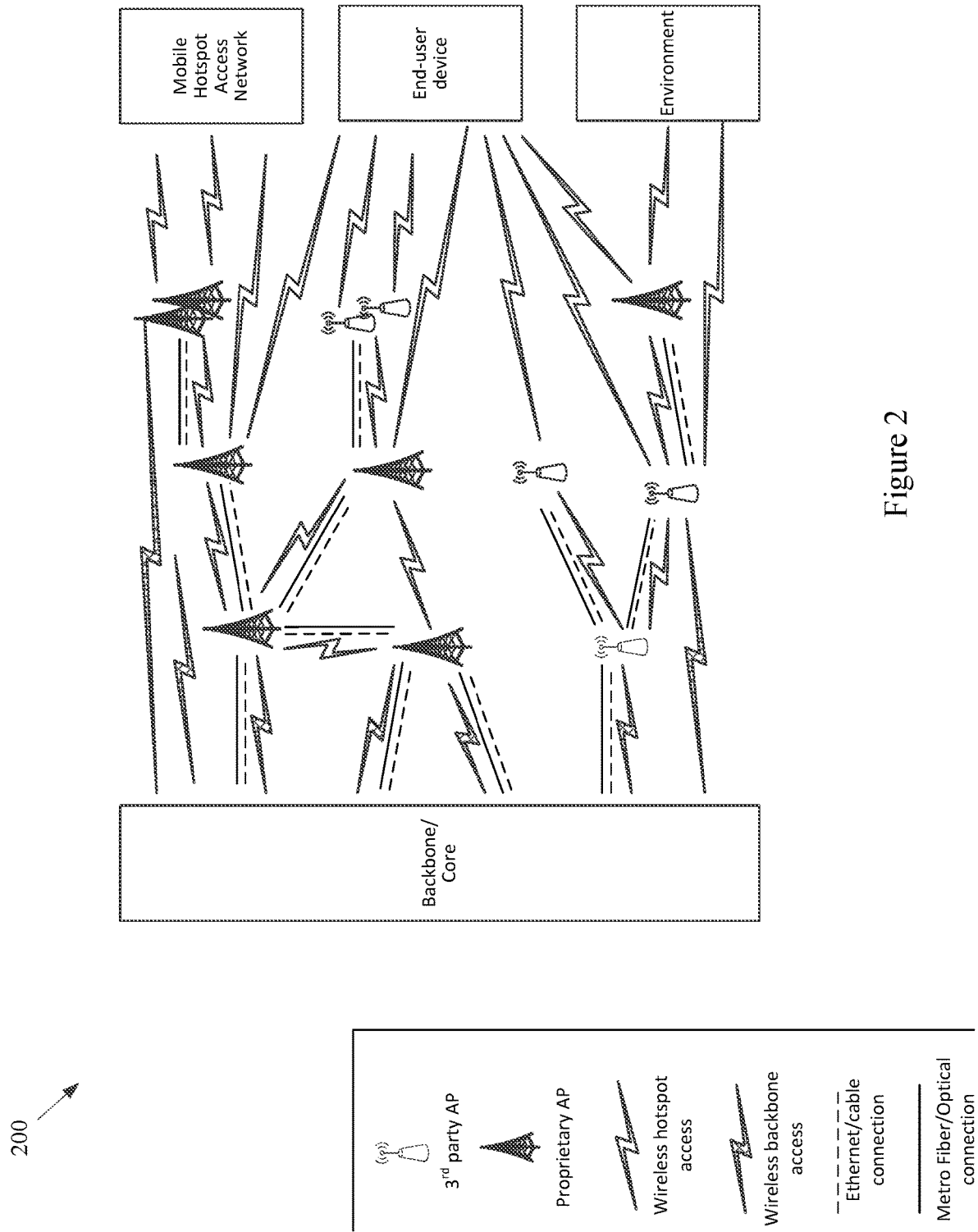
FIG. 2 shows a block diagram of a communication network, in accordance with various aspects of this disclosure.

The example network 100 may also, for example, comprise a Fixed Hotspot Access Network. Various example characteristics of such a Fixed Hotspot Access Network 200 are shown at FIG. 2. The example network 200 may, for example, share any or all characteristics with the other example methods, systems, networks and/or network components 100, 300, 400, 500-570, and 600, discussed herein n.

In the example network 200, the Fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a Fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a Fixed AP with no cable power source that can be placed virtually anywhere).

In the example network 200, the same Fixed AP can simultaneously provide access to multiple Fixed APs, Mobile APs (e.g., vehicle OBUs, etc.), devices, user devices, sensors, things, etc. For example, a plurality of mobile hotspot access networks (e.g., OBU-based networks, etc.) may utilize the same Fixed AP. Also for example, the same Fixed AP can provide a plurality of simultaneous accesses to another single unit (e.g., another Fixed AP, Mobile AP, device, etc.), for example utilizing different channels, different radios, etc.).

Note that a plurality of Fixed APs may be utilized for fault-tolerance/fail-recovery purposes. In an example implementation, a Fixed AP and its fail-over AP may both be normally operational (e.g., in a same switch). Also for example, one or more Fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Also, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
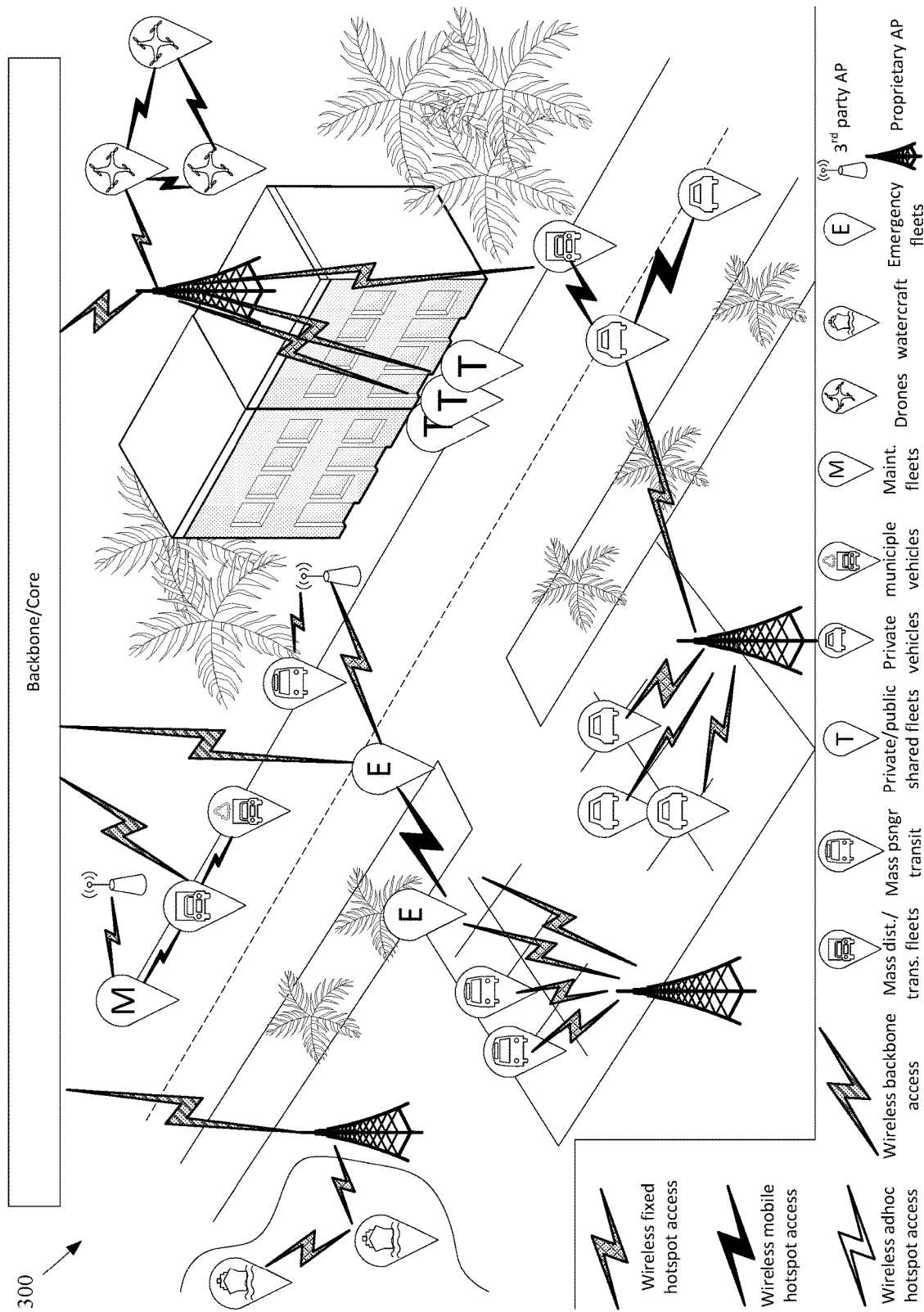
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., Fixed APs) are also illustrated. The example network 300 may, for example, share any or all characteristics with the other example methods, systems, networks and/or network components 100, 200, 400, 500-570, and 600, discussed herein.

The example network 300 comprises a wide variety of Mobile APs (or hotspots) that provide access to user devices, provide for sensor data collection, provide multi-hop connectivity to other Mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different Fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., Mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of a client's networking needs, many of examples of which are provided herein. For example, two Mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
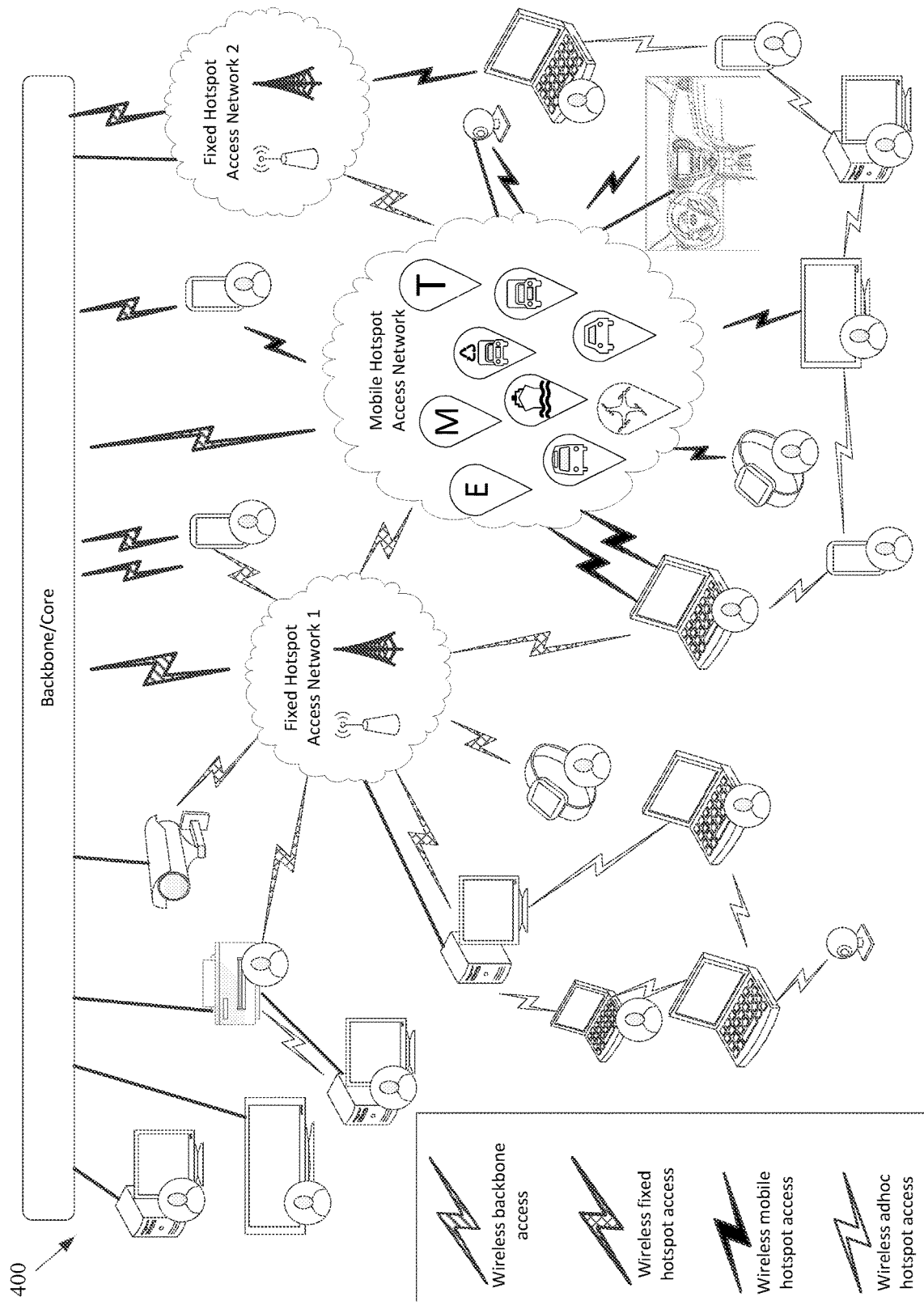
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400 may, for example, share any or all characteristics with the other example methods, systems, networks and/or network components 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g. any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device may, for example, operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein) may, for example, have redundant technologies to access distinct backbone, fixed hotspot, and/or mobile hotspot access networks, for example for fault-tolerance and/or load-balancing purposes (e.g., utilizing multiple SIM cards, etc.). A device may also, for example, simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
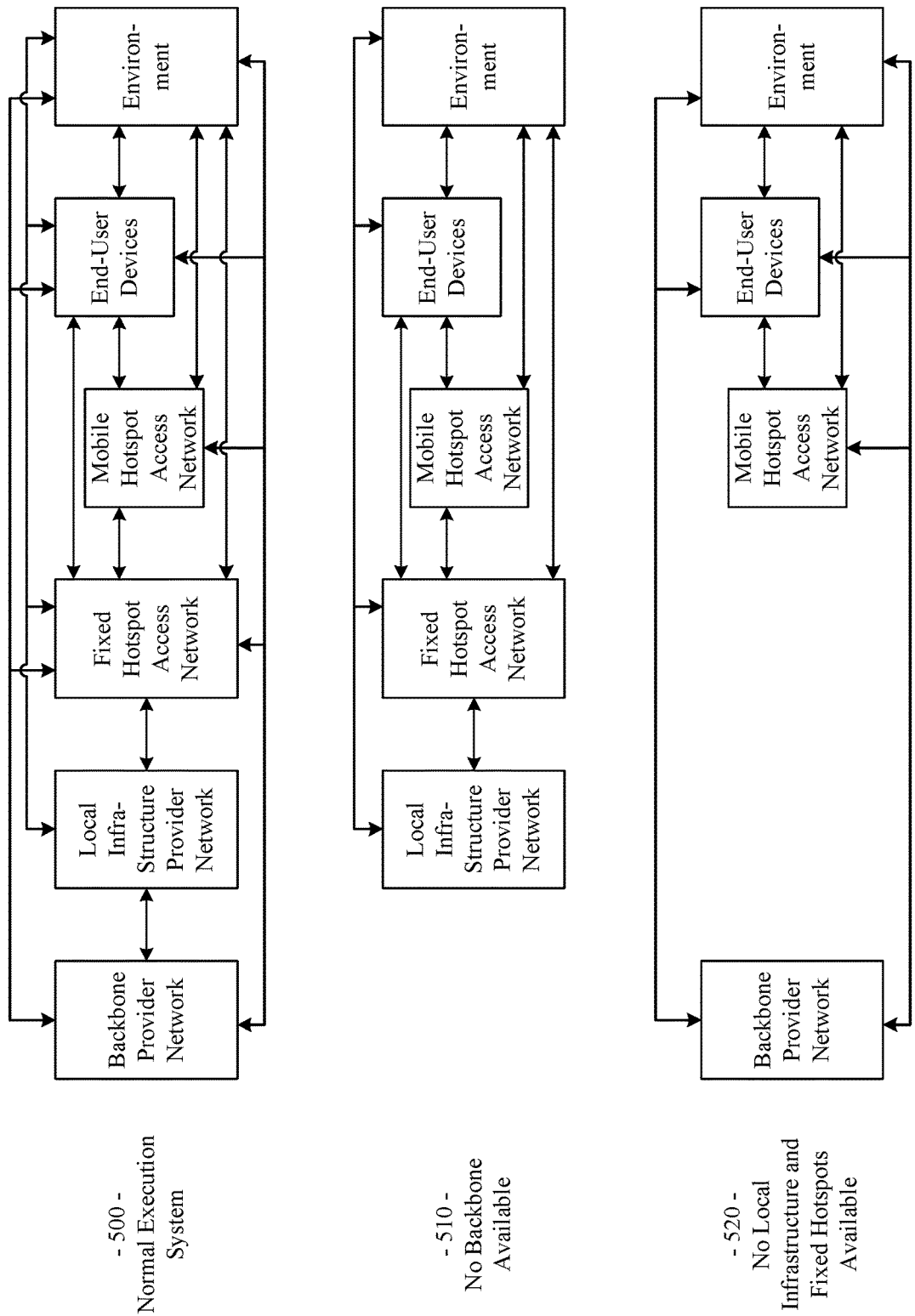
FIGS. 5A-5C show a plurality of network configurations illustrating the flexibility and/or and resiliency of a communication network, in accordance with various aspects of this disclosure.
Figure 5B:
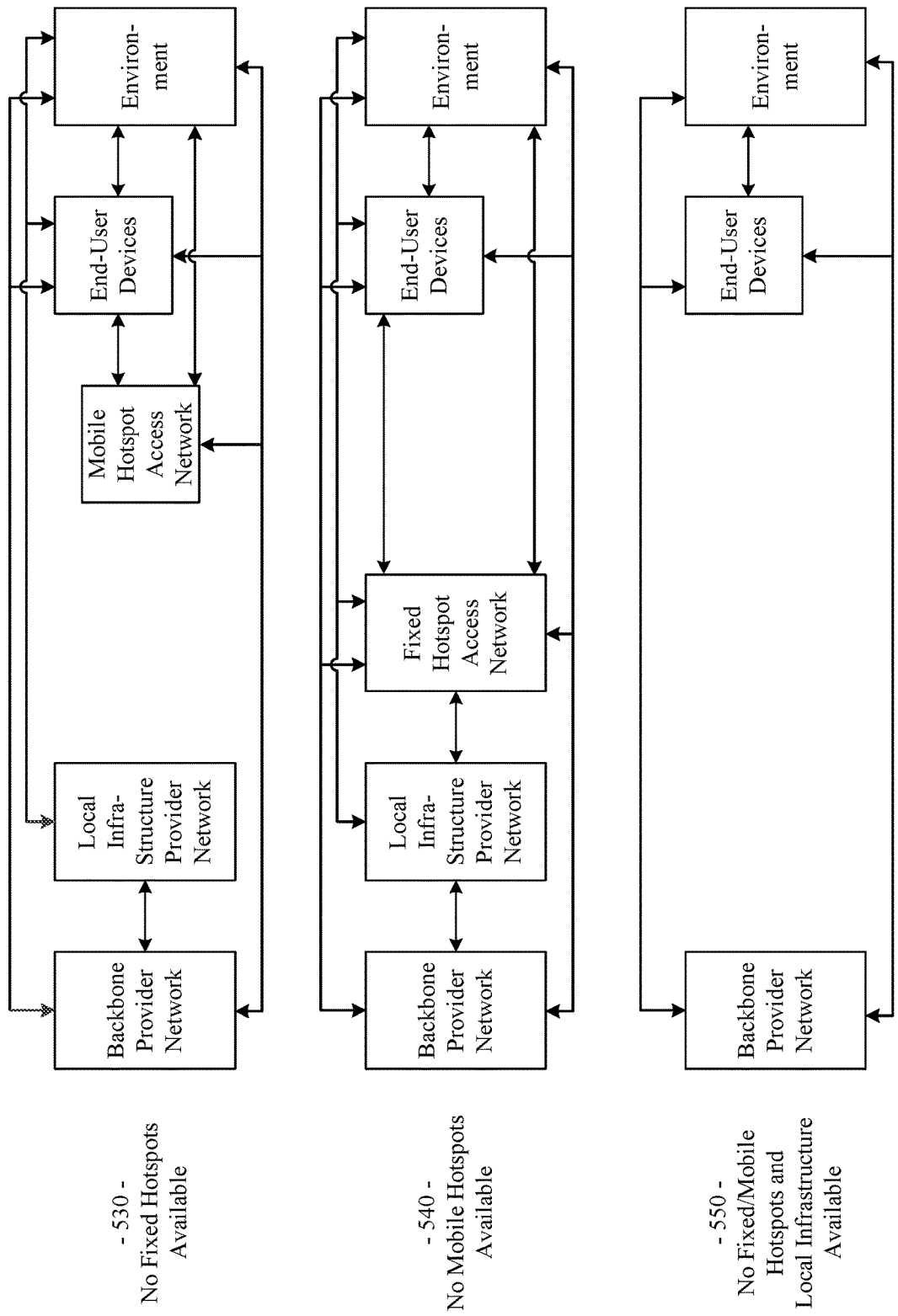
Figure 5C:
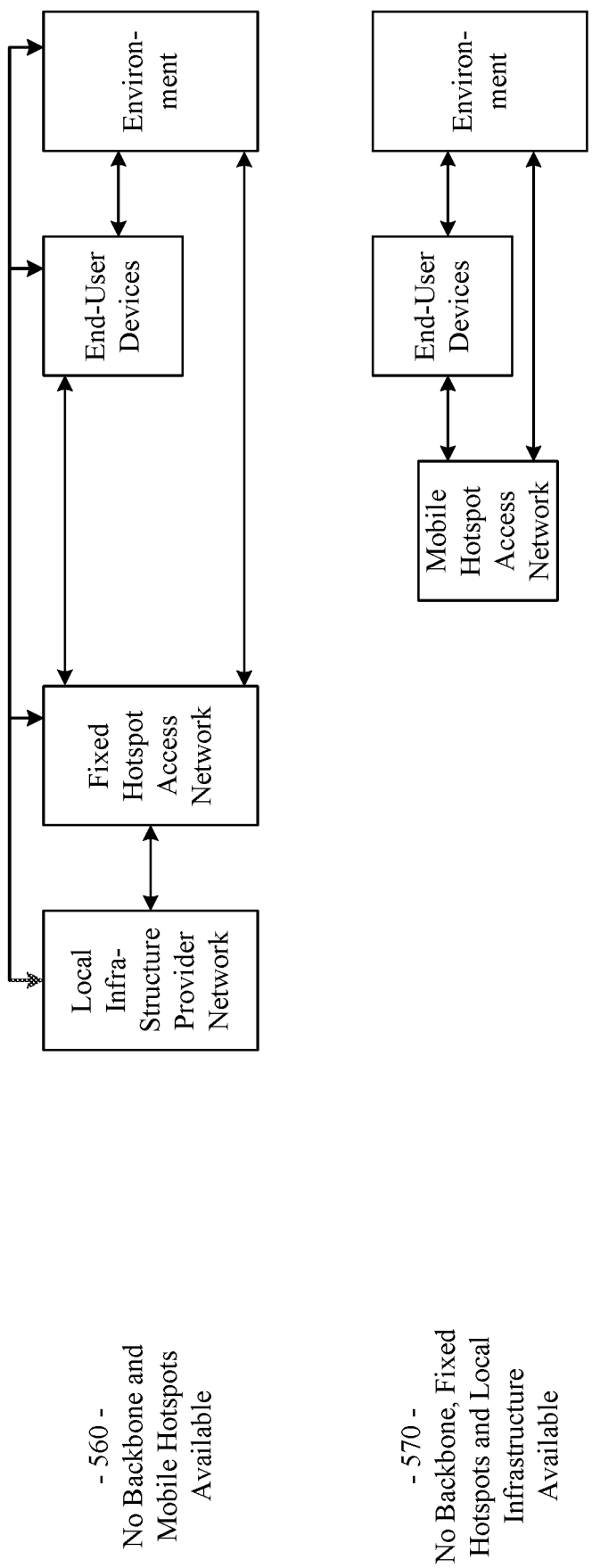

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570 may, for example, share any or all characteristics with the other example methods, systems, networks and/or network components 100, 200, 300, 400, and 600, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities may, for example, be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, for example a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Note that in various example implementations any of such wireless links may instead (or in addition) comprise a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode) may, for example, share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may instead (or in addition) comprise a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in Mobile APs, Fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode) may, for example, share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may instead (or in addition) comprise a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode) may, for example, share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Also note that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the Mobile APs may utilize a direct connection (e.g., a cellular connection) with the backbone provider network (or Cloud). If a Mobile AP does not have such capability, the Mobile AP may also, for example, utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530 may, for example, be utilized in a scenario in which there is no fiber (or other) connection available for Fixed APs (e.g., in a maritime scenario, in a plantation scenario, etc.), or in which a Fixed AP is difficult to access or connect. For example, one or more Mobile APs of the mobile hotspot access network may be used as gateways to reach the Cloud. The fourth example mode 530 may also, for example, be utilized when a vehicle fleet and/or the Mobile APs associated therewith are owned by a first entity and the Fixed APs are owned by another entity, and there is no present agreement for communication between the Mobile APs and the Fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode) may, for example, share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Also note that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Also note that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to Fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with Fixed APs, such communication may be utilized instead of Mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode) may, for example, share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 may also, for example, be utilized in rural areas in which Mobile AP presence is sparse, Fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode) may, for example, share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the Fixed APs Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode) may, for example, share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single Mobile AP, between clients of respective different Mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies, connected to multiple moving/static things with multiple technologies, forming wireless (mesh) hotspot networks over different environments, connected to multiple wired/wireless infrastructure/network backbone providers, ultimately connected to the Internet, Cloud or private network infrastructure.

Figure 6:
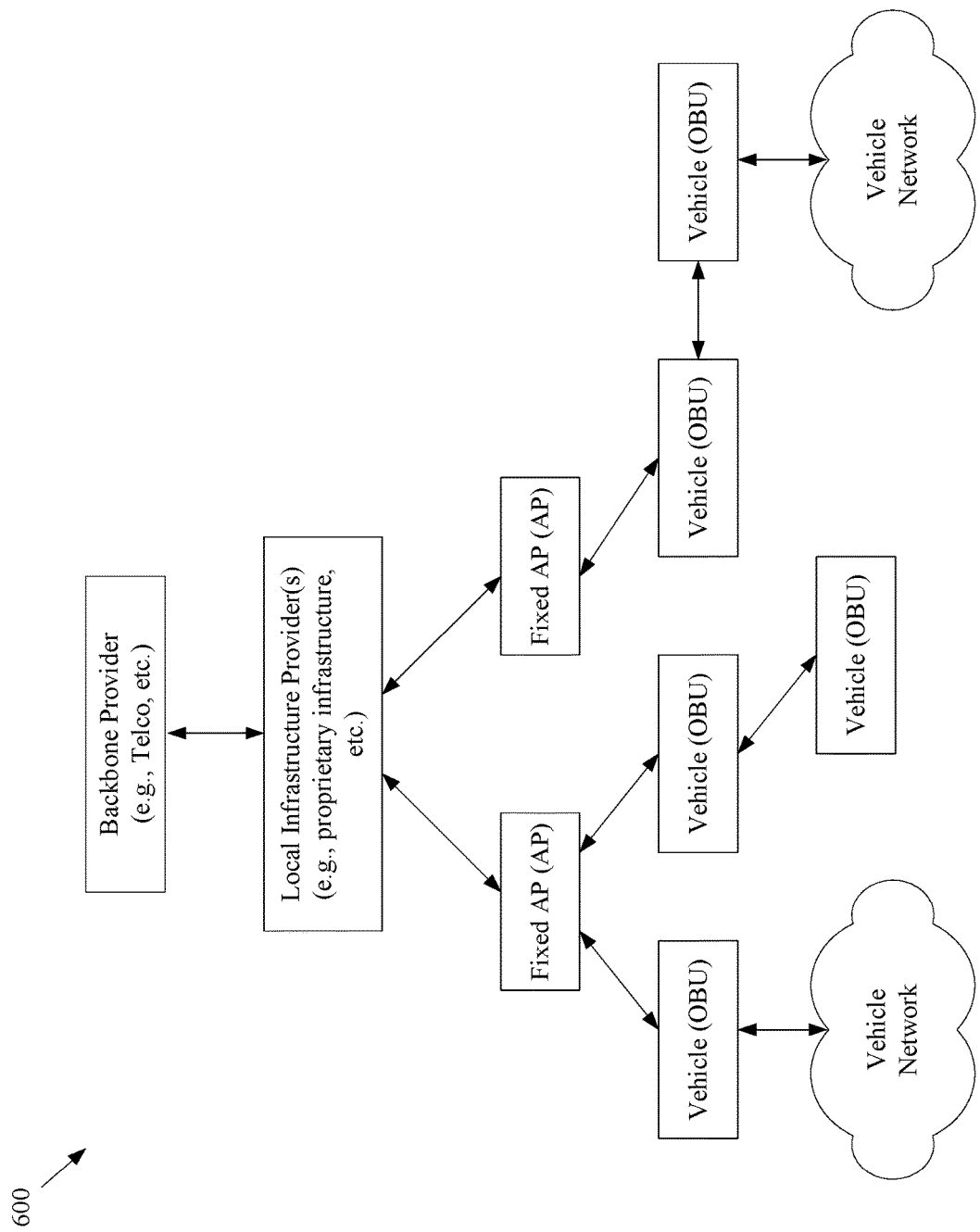
FIG. 6 shows a block diagram of an example communication network, in accordance with various aspects of the present disclosure.

FIG. 6 shows yet another block diagram of an example network configuration, in accordance with various aspects of the present disclosure. The example network 600 may, for example, share any or all characteristics with the other example methods, systems, networks and/or network components 100, 200, 300, 400, and 500-570, discussed herein. Notably, the example network 600 shows a plurality of Mobile APs (or OBUs), each communicatively coupled to a Fixed AP (or RSU), where each Mobile AP may provide network access to a vehicle network (e.g., comprising other vehicles or vehicle networks, user devices, sensor devices, etc.).

The operation of a network of moving things may involve severe reliability concerns, while simultaneously demanding fast development iteration cycles to meet customer and user demand for new features. Conventional testing methodologies are a poor match for networks of moving things, due to the use of high-reliability, networked, embedded hardware in such networks, as well as the need to test interactions with hardware modules supporting functionality involving communication technologies such as Direct Short Range Communication (DSRC) (e.g., radio frequency communication according to IEEE 802.11p), cellular communication networks (e.g., 3G, 4G, 5G, Code Division Multiple Access (CDMA), Global System for Mobile Communication (GSM), Wi-Fi (e.g., IEEE 802.11a/b/g/n/ac/af), and/or Global Navigation Satellite Systems (GNSS)/Global Positioning System (GPS) geolocation systems. The nature of the development process may involve the use of test data that is abundant and easy to replay, in order to capture and analyze failures that are difficult to reproduce. If a customer or end-user of a network of moving things reports a problem as it happens, it is desirable for a development or support team to be able to reproduce it locally as soon as they receive the report. For developers of such a network, it is desirable to be able to separate tests for issues involving hardware from those that are entirely contained in the software running on, for example, fixed or mobile access points (APs), network controllers (NCs), sensors, and other network elements (e.g., network nodes).

A system in accordance with various aspects of the present disclosure may use a dedicated entity to set up, control, and coordinate resources, topologies, and tests made across multiple fixed and/or mobile access points (APs), and to report the results of those tests. The system may use historical and/or live data to replicate the operation of a network of moving things, within a controlled environment. Use of such a system provides insight into the operation of fixed and mobile APs during normal operation, in order to replicate, understand, and correct errors, and may support manipulation of the main radio frequency medium properties relevant to the operation of a network of moving things in accordance with test data, including but not limited to aspects regarding signal power and medium congestion (e.g., aspects such as propagation, interference, and/or distortion). Such a system may support abstracting a fixed or mobile AP from its physical environment in order to easily reproduce and correct operational issues that may have been observed in the field, including the simulation of all types of environmental inputs and outputs. Such environmental inputs and outputs may include, by way of example and not limitation, Global Navigation Satellite System (GNSS)/ Global Positioning System (GPS) signals and data, various speeds of vehicle operation, the establishment and use of geo-fencing, and various aspects of radio frequency vehicle-to-vehicle (V2V) and vehicle-to-infrastructure (V2I) (e.g., Direct Short-Range Communication (DSRC)) information and transmissions. Such a system may also support the generation and processing of various types of environment sensor data, cellular network signals and/or data, varying numbers of Wi-Fi (e.g., IEEE 802.11a/b/g/n/ac/af) end-users, periods of downtime of AP interfaces, unexpected events, and changes/transitions of access point wireless connections from (1) one communication technology to another, (2) one vehicle network to another vehicle network or (3) a vehicle from a first fleet to a vehicle of another fleet, etc.), with the aim of testing being, for example, verifying proper functionality of a communication protocol, to validate message integrity, to perform load/scalability tests at a Cloud level, to evaluate control and/or handover delays, and/or to ensure compatibility between different network entities or network nodes.

The following discussion refers to a number of different types of testing including, but not limited to, "physical testing" (PT), "embedded testing" (ET), and "virtual testing" (VT). The term "physical testing" may be used herein to refer to testing that involves physical equipment and a testing environment that resembles deployment conditions, while the term "embedded testing" may be used herein to refer to testing that, although involving the use of physical equipment has no particular required environmental conditions. The term "virtual testing" may be used herein to refer to testing that does not involve physical equipment at all, and that may be run under emulation or virtualization on any suitable type of computer system (e.g., a testing server). The present disclosure will primarily focus on the first two approaches (i.e., "physical testing" and "embedded testing"). However, "virtual testing" is also supported by the mechanisms described herein.

Figure 7:
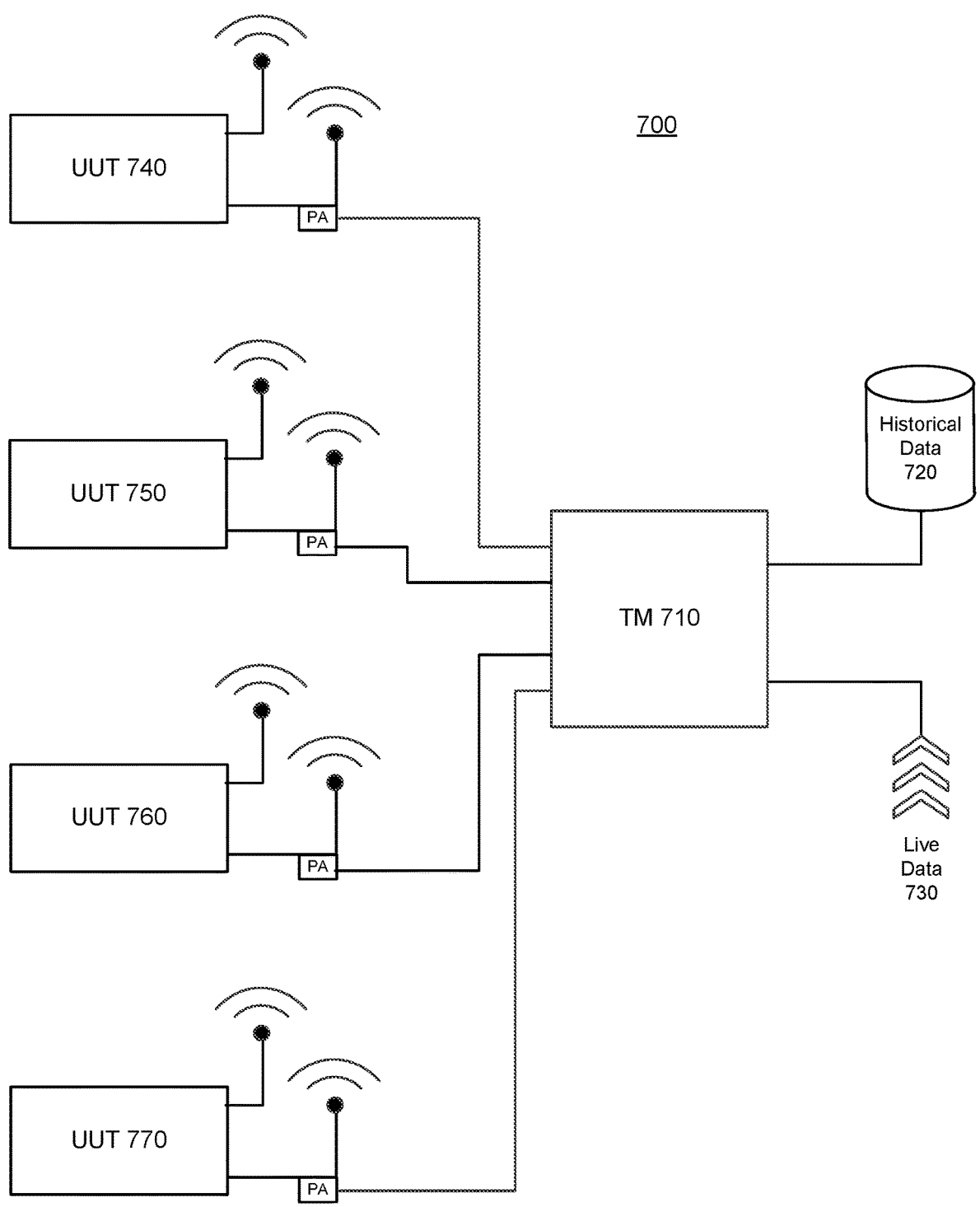
FIG. 7 is a block diagram illustrating an example testing scenario, in accordance with various aspects of the present disclosure.

FIG. 7 is a block diagram illustrating an example testing scenario 700, in accordance with various aspects of the present disclosure. The testing scenario 700 of FIG. 7 involves the use of a test manager (TM) 710 and a number of devices represented in FIG. 7 by units under test (UUTs) 740, 750, 760, 770. As shown in FIG. 7, the TM 710 is coupled to the UUTs 740, 750, 760, 770, to a repository of historical data 720, and to a source of live data 730. Although FIG. 7 shows four UUTs 740, 750, 760, 770, it should be noted that the number of UUTs shown in FIG. 7 does not represent a limitation of the present disclosure, and that the number of UUTs in a test system according to the present disclosure may be greater or less than the four shown in FIG. 7, without departing from the spirit or scope of the present disclosure.

In accordance with aspects of the present disclosure, the UUTs 740, 750, 760, 770 are network devices such as, for example, a fixed AP (e.g., a fixed AP as shown in and discussed above with respect to FIGS. 1-6) or mobile AP (e.g., an OBU/MAP as shown in and discussed above with respect to FIGS. 1-6), or a user device also referred to herein as a "user probe," whose inputs and outputs are to be respectively manipulated and/or observed by, for example, the TM 710. The term "user probe" (UP) is employed herein to refer to a device used to simulate the activity of a human end-user on a wireless network (e.g., a Wi-Fi (e.g., IEEE 802.11a/b/g/n/ac/af) or Bluetooth® enabled device capable of producing data traffic that is characteristic of end-user activity), for example. Various examples of a "user probe" may include, by way of example and not limitation, wireless enabled devices such as a cellular handset, a smartphone, a tablet computer, a laptop computer, or the like. In one example testing situation, the UUTs 740, 750, 760, 770 of FIG. 7 may correspond to, respectively, a smartphone, a first mobile access point, a fixed access point, and a second mobile access point. In another example testing situation, the UUTs 740, 750, 760, 770 may correspond to, respectively, a fixed access point, a mobile access point, a first user probe, and a second user probe. Other testing arrangements are also possible, as described above.

A test manager in accordance with various aspects of the present disclosure (e.g., the TM 710) may be responsible for controlling and coordinating the tests to be performed using one or more mobile and/or fixed APs and one or more user probes (UPs), for each of the testing scenarios defined above. A TM (e.g., the TM 710) may receive as input a set of test specifications (TS), and may process the test specifications to produce as output a matching set of test results (e.g., in the form of pass/fail values/indications). The term "test specifications" may be used herein to refer to a set of inputs to and expected outputs of the UUTs. In accordance with aspects of the present disclosure, the inputs to the UUTs may consist of "historical data," "live data," and/or other purpose-made data sources. The term "historical data" may be used herein to refer to data collected from elements (e.g., network nodes such as fixed APs, mobile APs, end-user devices, etc.) of an actual network during operation (e.g., a network of moving things) that has been stored and may later be used to perform tests of any of the above types, and which may be repeated as necessary. The term "live data" may be used herein to refer to data received from an actual network of moving things as described herein, while the network is in operation (e.g., an operating network of moving things) and within a short amount of time following the collection of the data. In accordance with various aspects of the present disclosure, in this context, the term "short amount of time" may refer to any of amount of time short enough that the collected data is still a reasonably accurate representation of the state of the network. That is, any amount of time that allows an operator or developer of the system to promptly and correctly diagnose issues with the network, as they occur. In practice, time intervals of such a "short amount of time" may, in some situations for example, be in the range of a few seconds (e.g., 1-3 seconds) or a few tens of seconds (e.g., 10-30 seconds), up to as much as a minute. In other situations, such a "short amount of time" may be in the range of a few tens of seconds to a few minutes. The distinguishing characteristic of "live data" compared to "historical data" is that "live data" may be represented in the form of "streaming" data, i.e., "live data" that is made available to the test manager (e.g., the TM 710) as soon as it is received from the operating network from which it originated.

In accordance with various aspects of the present disclosure, physical testing (PT) may use an arrangement of testing equipment that may be referred to herein as a "DSRC Performance Test Array" (DPTA). A DPTA may include, for example, a collection of one or more UUTs (e.g., UUTs 740, 750, 760, 770) spatially arranged in a fixed or adjustable/variable physical configuration, where each UUT has one or more radio frequency (RF) antennas. Each RF antenna may be dedicated to one or more radio frequency communication media (e.g., radio frequency and/or communication protocol), and may be connected to what is referred to herein as a "programmable attenuator" (PA), a device capable of physically modifying the signal loss (i.e., attenuation) in the path between the RF antenna and the respective UUT under the control of, for example, the TM 710. In accordance with various aspects of the present disclosure, each UUT (e.g., UUTs 740, 750, 760, 770) may have the ability to control its own RF transmission power. Alternatively, the arrangement of testing equipment may involve the use of a "radio frequency switching matrix" (RFSM) (not shown in FIG. 7), which may be used in place of the RF antennas and PAs discussed above and shown in FIG. 7.

The dominant physical factors for V2X (e.g., V2V and/or V2I) networking performance in a network of moving things in accordance with aspects of the present disclosure, and in which the network nodes (e.g., mobile APs/OBUs of vehicles) are not moving at very high speeds, are the strength of RF signals communicated between two network nodes (e.g., fixed and/or mobile APs) and the congestion of the RF communications medium in use. The term "very high speeds" may be used in the present context to refer to, e.g., the top speeds of some (e.g., 'road legal") sports cars. Such a top limit of speed may not, however, be relevant in most urban environments. The upper speed limit may, for example, be dependent upon the radio frequency technology in use, and may best be described as the maximum vehicle speed at which signal coherence is maintained. Normally, this may be on the order of 150 kilometers per hour (km/h) (93 miles per hour (mph)), or may be more that 150 km/h. During testing, both of these factors may be controlled using either an RFSM, or the DPTA described above, which may present significant cost advantages. In some situations, such a cost advantage may come at the expense of reduced accuracy when mimicking real-world operational data. RF communication channel congestion may be controlled, for example, by the TM enabling and disabling radio transmission by each individual UUT (e.g., UUTs 740 750, 760, 770), as desired. The manipulation of the RF signal strength in the DPTA for a fixed array of UUTs may, for example, rely on the ability to control, for each UUT, two independent variables: the UUT RF transmission power (TXP) and the programmable antenna attenuation (PAA) for the UUT.

For two UUTs, a and b, and a given radio frequency communication technology, we may represent the power transmitted by b and received by a as. We may also represent the path loss between the two UUTs, a and b, as. For the purposes of the present discussion, the path loss is assumed to be symmetric. That is, which holds for all realistic situations. may be used to denote the PAA for a, and the term may be used to denote the TXP for a. Given these quantities, we may then relate them as follows in a logarithmic scale, e.g., dBm:
or, in matrix form:

$$\begin{bmatrix} P_r(a,b)+L(a,b) \\ P_r(a,c)+L(a,c) \\ \vdots \\ P_r(b,a)+L(a,b) \\ P_r(b,c)+L(b,c) \\ \vdots \end{bmatrix} = \begin{bmatrix} -1 & -1 & 0 & \ldots & 0 & 0 & 1 & 0 & \ldots & 0 \\ -1 & 0 & -1 & \ldots & 0 & 0 & 0 & 1 & \ldots & 0 \\ & & & & \vdots & & & & & \\ -1 & -1 & 0 & \ldots & 0 & 1 & 0 & 0 & \ldots & 0 \\ 0 & -1 & -1 & \ldots & 0 & 0 & 0 & 1 & \ldots & 0 \\ & & & & \vdots & & & & & \end{bmatrix} \begin{bmatrix} A(a) \\ A(b) \\ \vdots \\ P_t(a) \\ P_t(b) \\ \vdots \end{bmatrix}$$

If is the number of UUTs in the DPTA, then this system has constraints (i.e., the for each UUT) and unknowns (i.e., the PAA and TXP for each UUT), which makes it overdetermined for, as may be the case for any practical DPTA. As may be expected, this suggests that there may not be a way to simulate all desired conditions with complete accuracy. It is, however, possible to obtain approximate solutions using methods such as a Least-Squares Method (LSM). Using optimizations like QR factorization (since the coefficient matrix on the right-hand side only depends on, the factorization may be performed in advance of testing and may be reused for all tests on the same DPTA), a system in accordance with the present disclosure may solve such a system in real-time at the time scales of interest for simulation (e.g., on the order of milliseconds), thereby rendering the DPTA a cost-effective mechanism for simulation and testing of fixed and mobile APs for use in a network of moving things. It is also feasible, using known techniques (e.g., weighted least squares), to attribute more weight to certain values, such as forcing two APs to be invisible to each other.

In accordance with various aspects of the present disclosure, once the response of a UUT (e.g., a fixed or mobile AP) to varying physical (e.g., radio frequency) conditions is well understood and tested, it may be desirable to study and test the response of the UUT to other conditions for which there may be either no need to perform physical simulations, or where such simulations are impractical or prohibitively expensive. For example, it may be unnecessary to physically transmit GNSS/GPS signals to the UUT (e.g., AP) in order to test the behavior of the UUT under different geographies, since UUTs may be expected to use off-the-shelf GNSS/GPS receivers that have specified characteristics and may be assumed to work properly as is.

Figure 8:
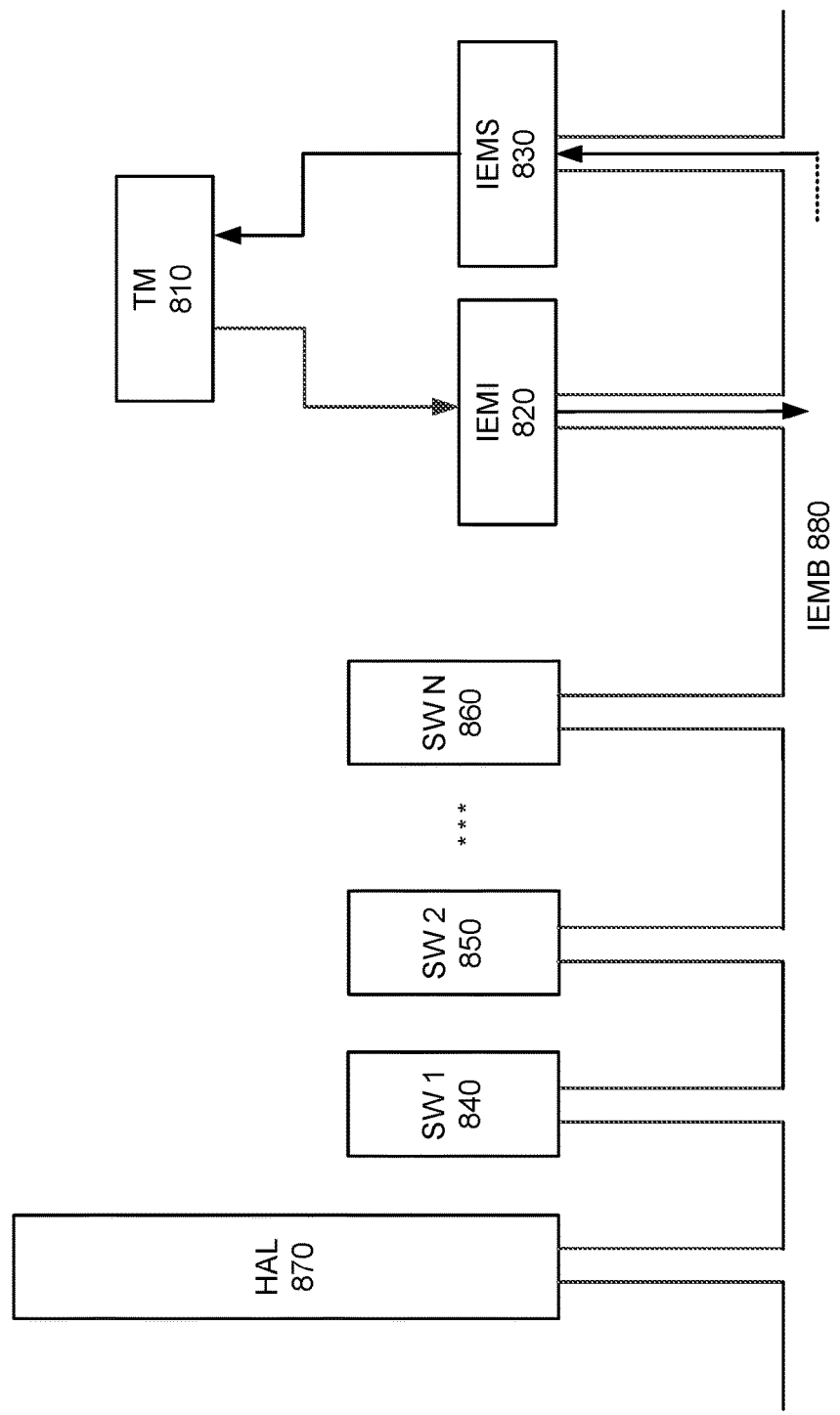
FIG. 8 is a block diagram illustrating an example architecture of an embedded testing (ET) system, in accordance with various aspects of the present disclosure.

FIG. 8 is a block diagram illustrating an example architecture of an embedded testing (ET) system 800, in accordance with various aspects of the present disclosure. The example ET system 800 comprises a variety of system entities including a test manager (TM) 810, a number of software applications SW 840, 850, 860, and a hardware abstraction layer (HAL) 870. The TM 810 may correspond to, for example, the TM 710 of FIG. 7, and as shown in the example of FIG. 8, is communicatively coupled to the software applications SW 840, 850, 860 and the hardware abstraction layer (HAL) 870 by an inter-entity messaging bus (IEMB) 880. In accordance with various aspects of the present disclosure, the IEMB 880 may comprise, for example, a software-based messaging mechanism that enables software applications (e.g., SW 840, 850, 860) to communicate with the HAL 870. In accordance with various aspects of the present disclosure, any entities communicatively coupled to the IEMB 880 may send messages to any other entity. This may be referred to herein as a "publish-subscribe" architecture. The example TM 810 of FIG. 8 interfaces to the IEMB 880 via an inter-entity message injector (IEMI) 820 and an inter-entity message sniffer (IEMS) 830, which respectively permit the TM 810 to transmit messages to and read messages from the IEMB 880. In this way, the TM 810 may send or "inject" a message to (i.e., send a message addressed to) any software application or the HAL 870 via the IEMI 820, and may receive via the IEMS 830 (e.g., "sniff") a copy or a message representative of any messages addressed to any software application or the HAL that is sent via the IEMB 880. In accordance with various aspects of the present disclosure, the software applications SW 840, 850, 860 may comprise software applications such as, by way of example and not limitation, the example software applications discussed in U.S. patent application Ser. No. 15/157,887 titled "Systems and Methods for Remote Software Update and Distribution in a Network of Moving Things," filed May 18, 2016; U.S. Provisional Patent Application Ser. No. 62/350,814 titled "Systems and Methods for Managing Containers in a Network of Moving Things," filed Jun. 16, 2016; and U.S. Provisional Patent Application Ser. No. 62/355,472 titled "Systems and Methods for the Flexible Access and Management of Monitoring Applications in a Network of Moving Things," filed Jun. 28, 2016, the content of each of which is hereby incorporated herein by reference, in its respective entirety. In accordance with various aspects of the present disclosure, the IEMB 880 of FIG. 8 may, for example, comprise messaging code (e.g., a collection of software/firmware/operating system functions or library routines) that enables the TM 810 to monitor (i.e., "sniff") messages transferred to/from the software applications (e.g., software applications SW 840, 850, 860) via the messaging mechanism of the IEMB 880, and to inject messages into the stream of messages flowing through the IEMB 880. The software applications SW 840, 850, 860 may, for example, access various hardware devices of a UUT (e.g., GNSS/GPS hardware, DSRC communication hardware, sensor hardware (e.g., accelerometer(s), gyroscope(s), magnetometer(s), etc.), vehicle electrical interface(s) (e.g., OBD/OBD-II, proprietary interfaces, autonomous vehicle system interfaces) not shown in FIG. 8) that may be abstracted by, for example, the HAL 870, via the messaging mechanism of the IEMB 880 and the HAL 870. In such an arrangement, the software applications SW 840, 850, 860 may not access such hardware directly, and such abstraction may avoid the need for a software application (e.g., software applications SW 840, 850, 860) to have any knowledge of the specifics of interfacing with the electrical hardware/registers of a hardware device of the UUT. The IEMI 820 and IEMS 830 may, for example, permit the TM 810 to inject messages into the messaging stream supported by the messaging code, and may enable the TM 810 to also monitor the message stream supported by the messaging code. The IEMB 880 permits the various entities of the ET system 800 (e.g., TM 810; software applications SW 840, 850, 860; and HAL 870) of FIG. 8 to transfer messages in a one-to-many distribution, and permits any entity of the ET system 800 to receive messages of various desired types, each having corresponding content. The IEMI 820 permits the creation and transmission of arbitrary messages to other entities on the IEMB 880 by the TM 810, while the IEMS 830 permits the TM 810 to receive from the IEMB 880, messages arbitrarily selected by the TM 810. Because the HAL 870 is connected to the software applications 840, 850, 860 via the IEMB 880, the HAL 870 may therefore be altered and/or replaced for the purposes of each individual test of the UUT and various other entities. It should be noted that a TM in accordance with various aspects of the present disclosure (e.g., the TM 810) may, but need not, reside on the same processing platform (i.e., CPUs, memory, etc. of a computing system) as the software applications SW 840, 850, 860, in that the IEMI 820 and IEMS 830 may communicate (e.g., via one or more wired or wireless communication link(s)) with one or more systems separate from the processing platform that supporting the software applications 840, 850, 860 and the HAL 870.

In a testing system in accordance with various aspects of the present disclosure, a UUT such as, for example, an AP (e.g., a fixed or mobile AP (FAP/RSU or MAP/OBU, respectively) equipped with the four mechanisms discussed above (e.g., the IEMB 880, IEMI 820, IEMS 830, HAL 870 of FIG. 8) enables software system testing in isolation from other UUTs (e.g., APs or network entities such as network controllers (NCs) or Cloud-based servers). If every entity in the AP software (e.g., system monitor, update manager, network manager, delay tolerant network (DTN)) is connected to the IEMB 880 and uses the HAL 870 to access hardware functionality (e.g., GNSS/GPS, DSRC networking, Wi-Fi networking, vehicle networking, autonomous vehicle system networks, etc.), the testing system of the present disclosure enables TM control of the AP behavior entirely through the use of an IEMI such as the IEMI 820 of FIG. 8. A TM such as, for example, the TM 810 may then use the IEMI 820, and an IEMS such as the IEMS 830, to provide stimulus to a UUT, and to observe the results of the actions of the UUT, in order to compare the actions of the UUT with the expected behaviors indicated in the TS. A TM in accordance with the present disclosure (e.g., TM 810) may then, for example, perform ET on multiple UUTs simultaneously using the same TS, in order to detect consistency issues (e.g., race conditions, hardware variation defects, etc.), which may otherwise be difficult or time-consuming to detect.

For example, an embedded testing arrangement such as that described herein may be used to verify the proper operation of, for example, a "geo-fence." The term "geo-fence" may be used herein to refer to a defined geographic boundary inside or outside of which designated actions may be initiated, performed, enabled, and/or disabled. To simulate the travel path of a mobile AP through a geographic region and verify the proper functioning of a DSRC-based geo-fence, the TM (e.g., TM 810) may, as an illustrative example, use an IEMI of the UUT (e.g., IEMI 820) to inject GNSS/GPS location data and DSRC neighbor information into the IEMB of the UUT (e.g., the mobile AP) or into multiple UUTs. Simultaneously, the TM 810 may, for example, use an IEMS (e.g., IEMS 830) to monitor the DSRC behavior of the UUTs, to verify whether, once the geographic coordinates represented by the injected GNSS/GPS location coordinate information move outside of a configured DSRC geo-fence, all DSRC communication is halted, regardless of the DSRC connection opportunities and neighbors present. The TM (e.g., TM 810) may then produce a "pass" result if the expected outputs/behaviors are observed for all UUTs, or may produce a "fail" result otherwise. In accordance with aspects of the present disclosure, the HAL 870 may emulate hardware components (e.g., one or more communication interfaces, GNSS/GPS receivers, sensors, etc.) without those components actually being present. In the case of a GNSS/GPS receiver, the HAL 870 may, for example, emulate the behavior of such a device by using GNSS/GPS receiver data previously collected from a real, physical system. Such historical data may, for example, be provided to the HAL 870 by the TM 810, in advance of need, or when needed. Testing in this manner may allow developers/testers to discover whether the UUT behaves as expected, in response. The HAL is, therefore, able to stand on its own as well as act as an interface with any existing hardware. In accordance with aspects of the present disclosure, when a software application (e.g., of the AP) sends a request for GNSS/GPS coordinate information to the HAL 870, the TM may use the IEMS during testing to sniff the request, and may use the IEMI to send messages containing the desired GNSS/GPS coordinates (e.g., on a second-by-second basis) to the HAL 870. Then, the software application that requested GNSS/GPS coordinate information from the HAL 870 may receive, from the HAL 870, a response containing the desired GNSS/GPS coordinate information received by HAL 870 from the TM. The operation of a HAL in this manner enables software applications to always use the HAL to access hardware functionality, whether real or virtual.

By injecting the appropriate data through an IEMI such as that described above, it is also possible to run what may be referred to herein as a "virtual AP," in which testing may be performed to verify proper operation during a virtual trip of an end-user over different vehicular environments, when travelling on different types of vehicles and/or connected to different APs. In accordance with various aspects of the present disclosure, an OBU/MAP may, for example, perform a "virtual trip" that brings the OBU/MAP into "contact" with different (virtual) RSUs/FAPs and other OBUs. In this situation, there is no actual end-user device (such as, e.g., a mobile phone, smart phone, or laptop). The testing outcome may be achieved by the TM (e.g., TM 810) "injecting" GNSS/GPS coordinate data and DSRC neighbor information through the IEMB.

Figure 9A:
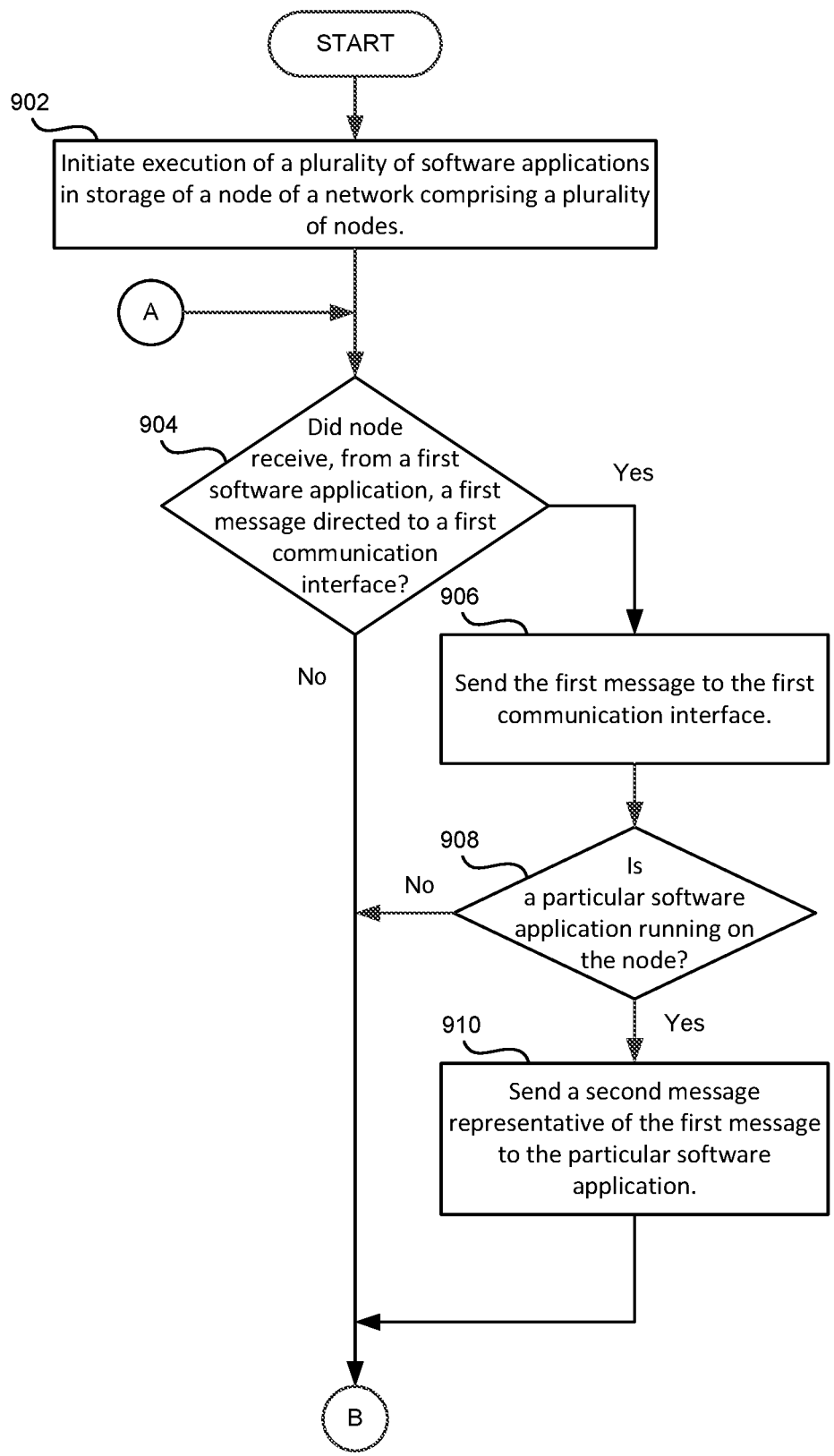
FIGS. 9A-9C are a flowchart illustrating the action of a method of operating aspects of a node of a network comprising a plurality of nodes, in accordance with various aspects of the present disclosure.
Figure 9B:
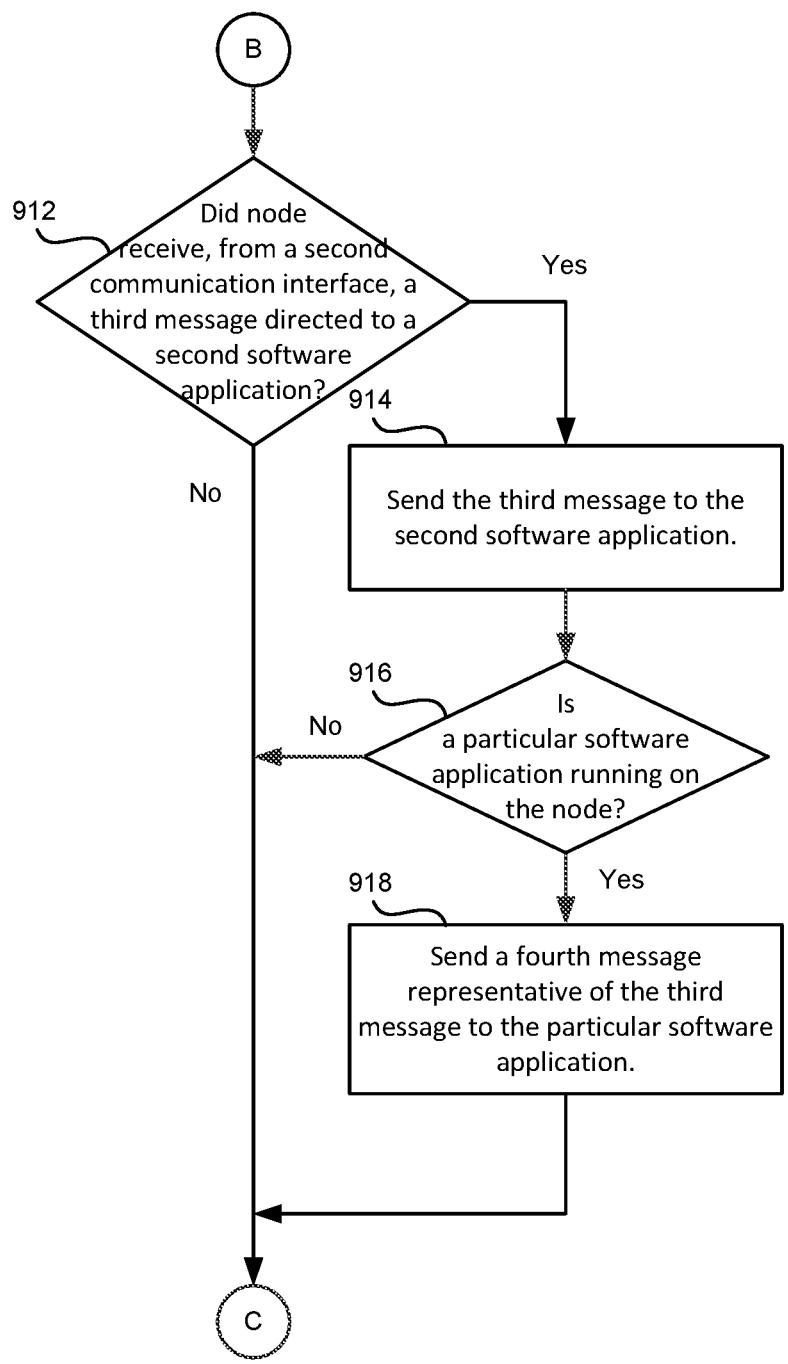
Figure 9C:
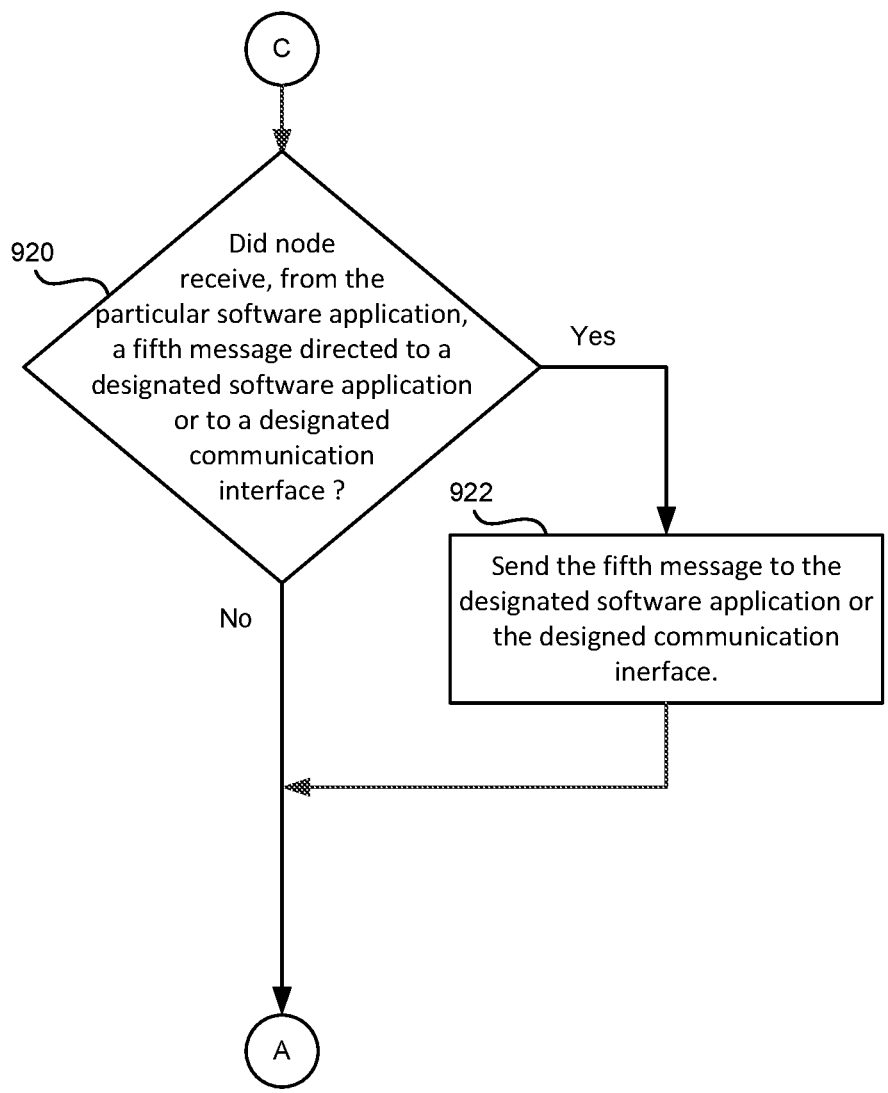

FIGS. 9A-9C are a flowchart illustrating the action of a method of operating aspects of a node of a network comprising a plurality of nodes, in accordance with various aspects of the present disclosure. The nodes of such a network may correspond to, by way of example and not limitation, the fixed and mobile access points (i.e., FAPs, MAPs) described above. Various actions of the method of FIGS. 9A-9C may be performed by hardware, software, or a combination of hardware and software of a node of a network such as the network described herein. Actions may be performed, for example, by a particular software application running on the node, where that software application provides, in part, a messaging mechanism for communication among software applications and communication interfaces of the node. The method of FIGS. 9A-9C begins at block 902.

At block 902, one or more processors of a node of the network may initiate execution of a plurality of software applications stored in storage of the node. Such software applications may, for example, comprise executable instructions that monitor environmental conditions (e.g., temperature, humidity, light level, air pressure, oxygen levels, levels of various pollutants, acoustic noise, etc.) around the node, provide wireless (e.g., Wi-Fi IEEE 802.11a/b/g/n/ac/ad/af), Bluetooth®, etc.) Internet service to wireless-enabled end-user devices (e.g., smart phones, tablet computers, laptop computers, e-readers, etc.) within wireless communication range of the node, and/or monitor and/or report vehicle operational parameters (e.g., speed, direction, current geographic location/coordinates, engine parameters, current electric battery capacity, remaining fuel, etc.) for a node located in a vehicle such as an auto, taxi, truck, bus, train, or autonomous vehicle.

At block 904, the method may determine whether a first message directed (e.g., addressed) to a first communication interface has been received from a first software application of the plurality of software applications running on the one or more processors of the node. The first communication interface may, for example, be a wired interface (e.g., an electrical connection to a sensor, a vehicle system, etc.) or a wireless (e.g., radio frequency, optical, acoustic, etc) communication interface for communicating with elements of a wireless network infrastructure (e.g., one or more fixed or mobile access points, one or more cellular networks, a constellation of satellites (e.g., a GNSS/GPS system)). Access to the functionality of the communication interfaces of a node according to various aspects of the present disclosure may be via, for example, what may be referred to herein as a "hardware abstraction layer" such as the HAL 870 of FIG. 8, which may permit software applications of a node (e.g., SW 840, 850, 860 of FIG. 8) to transmit and receive status information, data, commands, responses, etc. to and from the communication interfaces of a node. If, at block 904, it is determined that a first message directed to a first communication interface has not been received from a first software application of the plurality of software applications running on the one or more processors of the node, the method of FIG. 9 may continue at block 912 of FIG. 9B, discussed below. If, however, it is determined that a first message directed to a first communication interface has been received from a first software application, the method may then proceed to block 906.

At block 906, the method of FIGS. 9A-9C may send the received first message to the first communication interface to which it was directed. In accordance with aspects of the present disclosure, this may mean sending the received first message to executable code (e.g., a software application) that implements a hardware abstraction layer such as, for example, the HAL 870, for example. The HAL (e.g., HAL 870) may perform an operation indicated in the received first message upon the indicated communication interfaces, without need for the software application that sent the first message to have detailed knowledge of the first communication interface.

Next, at block 908, the method of FIGS. 9A-9C may determine whether a particular software application is running on or communicating with the node performing the method of FIGS. 9A-9C. Such a software application may, for example, be a software application that acts as a test manager, such as the TM 810 of FIG. 8, described above. As described above, a test manager in accordance with aspects of the present disclosure may orchestrate the testing of one or more network elements in a manner described by a "test specification." In accordance with one aspect of the present disclosure, such a test manager may run as a software application on the node performing the method of FIGS. 9A-9C, while in accordance with other aspects of the present disclosure, the test manager may have a first portion running on the node performing the method of FIGS. 9A-9C, which may communicate with a second portion running on another system (e.g., separate, remote, and/or Cloud-based computer system). In other aspects according to the present disclosure, the software application may perform functionality other than that of a test manager as described herein, without departing from the spirit and scope of the present disclosure. If, at block 908, it is determined that the particular software application is not running on or communicating with the node, the method may continue at block 912 of FIG. 9B, which is discussed below. If, however, it is determined, at block 908, that the particular software application is running on or communicating with the node, the method may continue at block 910, where one or more processors performing the method may cause a second message representative of the received first message to be sent to the particular software application. In accordance with aspects of the present disclosure, the second message may be considered to be representative of the received first message only if the second message accurately conveys all of the information from the first message needed to perform the functionality of the particular software application. In other words, the second message need not, but may be the same message (e.g., the same digital information and format) as the first message, or may simply comprise all of the information needed to perform the functionality of the particular software application in a message of a different format; fewer, more, or different, information elements; or a different digital representation. The method may then continue at block 912 of FIG. 9B.

At block 912 of FIG. 9B, the method may determine whether a third message directed (e.g., addressed) to a second software application has been received from a second communication interface. In accordance with aspects of the present disclosure, the second communication interface may (but need not) be the same as the first communication interface, the second software application may (but need not) be the same as the first software application, and the third message may (but need not) be a response to the second message discussed above. In accordance with other aspects of the present disclosure, the second communication interface may be a different communication interface, may communicate using a different medium (e.g., wired vs. wireless (e.g., RF, optical, acoustic)) and/or communication protocol, and the first software application and the second software application may be different software applications. In accordance with aspects of the present disclosure, circuitry for the transmit and receive paths of a communication link of a node, whether a wired or wireless communication link, may be considered to be separate communication interfaces or parts of one communication interface. If it is determined, at block 912, that a third message directed to a second software application has not been received from a second communication interface, the method of FIGS. 9A-9C may continue at block 920 of FIG. 9C, discussed below. If, however, it is determined, at block 912, that a third message directed to a second software application has been received from a second communication interface, the method of FIGS. 9A-9C may continue at block 914. It should be noted that third message may be received from executable code implementing a HAL, as described above.

At block 914, the method of FIGS. 9A-9C may send the received third message to the second software application, to which it was directed. In accordance with aspects of the present disclosure, receiving the third message may comprise receiving the third message from executable code (e.g., a software application) that implements a hardware abstraction layer such as, for example, the HAL 870 discussed above. The HAL may, in accordance with aspects of the present disclosure, initiate the sending of the third message, or may send the third message in response to, for example, a request message sent by the second software application, such as in response to a request for an action (e.g., transmit a message, return status information, etc.) by the second communication interface.

Next, at block 916, the method may determine whether a particular software application is running on or communicating with the node performing the method of FIGS. 9A-9C. As discussed above, such a software application may, for example, be a software application that acts as a test manager, such as the TM 810 of FIG. 8, described above. As also described above, a test manager in accordance with aspects of the present disclosure may orchestrate the testing of one or more network elements in a manner described by a "test specification." Such a test specification may include operations to take place, and expected responses, and the test manager may verify operation by reviewing messages (e.g., commands, response, data, status information, etc.) transmitted and/or received by elements of a node in accordance with the present disclosure. If, at block 916, it is determined that the particular software application is not running on or communicating with the node, the method of FIGS. 9A-9C may continue at block 920, discussed below. If, however, it is determined, at block 916, that the particular software application is running on or communicating with the node, the method of FIGS. 9A-9C may continue at block 918.

At block 918, the method may send a fourth message representative of the received third message, to the particular software application. In accordance with aspects of the present disclosure, the fourth message may be considered representative of the received third message, only if the fourth message accurately conveys all of the information from the third message needed to perform the functionality of the particular software application. In other words, the fourth message need not, but may be the same message (e.g., the same digital information and format) as the third message, or may comprise all of the information needed to perform the functionality of the particular software application in a message of a different format; fewer, more, or different, information elements; or a different digital representation. The method may then continue at block 920 of FIG. 9C.

At block 920, the method may determine whether a fifth message, directed to a software application designated in the fifth message or to a communication interface designated in the fifth message has been received from the particular software application discussed above. If, at block 920, the method determines that such a fifth message has not been received, the method of FIGS. 9A-9C may then continue at block 904, discussed above. If, however, the method determines that such a fifth message has been received, the method of FIGS. 9A-9C may then continue at block 922 wherein the fifth message received from the particular software application (e.g., a test manager) may send the received fifth message to the designated software application or to the designated communication interface. In this manner, the particular software application may, for example, "inject" messages into the communication paths of the node arrangement shown in FIG. 8, according to, for example, test specification(s) that define, by way of example and not limitation, what messages are to be sent to what software applications and/or what communication interfaces, and what messages are to be verified as received from which software applications and/or communication interfaces, under what conditions defined by the test specification. It should be noted that, in accordance with aspects of the present disclosure, such a test specification may identify one or more elements of a message to be sent or verified as received, and values of each to be sent or verified as received, and that elements of messages sent and/or received need be only as defined by a test specification (e.g., exactly matching, within a defined range of values, matching one of a number of defined values, no match necessary, etc.).

The DPTA of the present disclosure is a cost-effective, flexible mechanism to provide physical testing under laboratory conditions that may sacrifice little accuracy in mimicking real-world data. The IEMB and associated IEMI and IEMS, along with the HAL, as described herein provide a generic mechanism to isolate the operation of a network device from its physical environment, which facilitates testing devices under physically impossible conditions, in cases of sensor failures, etc. The use of historical data in the manner described in this disclosure permits the repeated replaying of testing contexts in which malfunctions occur and enables developers to investigate them more thoroughly. In addition, the use of "live data" permits developers to observe in real-time the issues that may be affecting a client or end-user of the network. Further, the ability of a system in accordance with the present disclosure to coordinate multiple UUTs simultaneously in the same test with the same dataset greatly increases the chances of detecting rare problems and edge-case conditions.

A testing system in accordance with various aspects of the present disclosure permits a development team for a network of moving things to greatly improve network reliability, which is an issue of concern for all users, and to reduce the length of development cycles, thereby improving the performance of the network and reducing costs for end-users. Such a testing system may support the simulation of operation of multiple fixed and/or mobile APs, in the cloud to support virtual testing (VT) and to reduce the need for physical testing infrastructure.

In accordance with various aspects of the present disclosure, systems and methods are provided that manage a vehicle communication network, for example in accordance with the location of nodes and end devices, in a way that provides for stable TCP/IP Internet access, among other things. For example, an end user may be provided with a clean and stable Wi-Fi Internet connection that may appear to the end user to be the same as the Wi-Fi Internet connection at the user's home, user's workplace, fixed public Wi-Fi hotspots, etc. For example, for a user utilizing a communication network as described herein, a TCP session may stay active, downloads may process normally, calls may proceed without interruption, etc. As discussed herein, a vehicle communication network in accordance with various aspects of this disclosure may be applied as a transport layer for regular Internet traffic and/or for private network traffic (e.g., extending the access of customer private LANs from the wired network to vehicles and users around them, etc.).

In accordance with an example network implementation, although a user might be always connected to a single Wi-Fi AP of a vehicle, the vehicle (or the access point thereof, for example an OBU) is moving between multiple access points (e.g., Fixed APs, other Mobile APs, cellular base stations, fixed Wi-Fi hotspots, etc.). For example, mobility management implemented in accordance with various aspects of the present disclosure supports the mobility of each vehicle and its users across different communication technologies (e.g., 802.11p, cellular, Wi-Fi, etc.) as the Mobile APs migrate among Fixed APs (and/or Mobile APs) and/or as users migrate between Mobile APs.

In accordance with various aspects of the present disclosure, a mobility controller (MC), which may also be referred to as an LMA or Network Controller, may monitor the location (e.g., network location, etc.) of various nodes (e.g., Mobile APs, etc.) and/or the location of end users connected through them. The mobility controller (MC) may, for example, provide seamless handovers (e.g., maintaining communication session continuity) between different access points and/or different technologies with low link latency and low handover times.

The architecture provided herein is scalable, for example taking advantage of redundant elements and/or functionality to provide load-balancing of control and/or data communication functionality, as well as to decrease failure probability. Various aspects of the present disclosure also provide for decreased control signaling (e.g., in amount and/or frequency), which reduces the control overhead and reduces the size of control tables and tunneling, for example both in backend servers and in APs (e.g., Fixed APs and/or Mobile APs).

Additionally, a communication network (or components thereof) in accordance with various aspects of this disclosure may comprise the ability to interact with mobile devices in order to control some or all of their connection choices and/or to leverage their control functionality. For example, in an example implementation, a mobile application can run in the background, managing the available networks and/or nodes thereof and selecting the one that best fits, and then triggering a handoff to the selected network (or node thereof) before breakdown of the current connection.

The communication network (or components thereof) is also configurable, according to the infrastructure requirements and/or mobility needs of each client, etc. For example, the communication network (or components thereof) may comprise the capability to support different Layer 2 (L2) or Layer 3 (L3) implementations, or combinations thereof, as well as IPv4/IPv6 traffic.

Aspects of the present disclosure may be seen in a method of operating a node of a network of moving things comprising a plurality of nodes. Such a method may comprise initiating execution of each of a plurality of software applications resident in at least one storage of the node; and receiving a first message from a first software application of the plurality of software applications, where the first message is directed to a first communication interface of a plurality of communications interfaces of the node. The method may comprise, in response to receipt of the first message, sending the first message to the first communication interface, and if the plurality of software applications comprises a particular software application, sending a second message representative of the first message to the particular software application. The method may also comprise receiving a third message from a second communication interface of the plurality of communication interfaces, where the third message is directed to a second software application of the plurality of software applications. The method may comprise, in response to the receipt of the third message, sending the third message to the second software application, and if the plurality of software applications comprises the particular software application, sending a fourth message representative of the third message to the particular software application. The method may further comprise, if a fifth message directed to a designated software application of the plurality of software applications or directed to a designated communication interface of the plurality of communication interfaces is received from the particular software application, sending the fifth message to the designated software application or the designated communication interface.

In accordance with various aspects of the present disclosure, the plurality of communication interfaces may comprise a receiver of radio frequency signals from satellites of a global navigation satellite system and a radio frequency wireless communication interface for communicating directly with other nodes of the plurality of nodes. The plurality of communication interfaces may comprise a communication interface configured to directly communicatively couple with a network used in a vehicle to communicate vehicle operational parameters, and the plurality of communication interfaces may comprise a communication interface configured to communicate with a system of an autonomous vehicle. The plurality of software applications may comprise a software application that monitors one or more characteristics of an atmospheric environment surrounding a vehicle carrying the node, and the plurality of software applications may comprise a software application that provides Internet access to one or more wireless-enabled end-user devices via a wireless communication interface of the node. The particular software application may send one or more messages to software applications of the plurality of software applications according to a specification for testing the node, and the particular software application may transmit information received from the first message or the third message to a cloud-based system that is a source of the specification for testing the node.

Additional aspects of the present disclosure may be found in a non-transitory computer-readable medium on which is stored a plurality of code sections, where each code section comprises a plurality of instructions executable by one or more processors, and where the instructions cause the one or more processors to perform the actions of a method of operating a node of a network of moving things comprising a plurality of nodes, the steps of the method being those of the method described above.

Further aspects of the present disclosure may be observed in a system for a node of a network of moving things comprising a plurality of nodes. Such a system may comprise one or more processors operably coupled to at least one storage of the node for storing instructions executable by the one or more processors and to a plurality of communication interfaces. In such a system, the one or more processors may be operable to, at least, perform the actions of the method described above.

In accordance with various aspects of this disclosure, examples of the networks and/or components thereof presented herein are provided in U.S. Provisional Application Ser. No. 62/222,192, titled "Communication Network of Moving Things," filed on Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Application Ser. No. 62/221,997, titled "Integrated Communication Network for A Network of Moving Things," filed on Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Application Ser. No. 62/222,016, titled "Systems and Methods for Synchronizing a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Application Ser. No. 62/222,042, titled "Systems and Methods for Managing a Network of Moving Things," filed on Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Application Ser. No. 62/222,066, titled "Systems and Methods for Monitoring a Network of Moving Things," filed on Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Application Ser. No. 62/222,077, titled "Systems and Methods for Detecting and Classifying Anomalies in a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Application Ser. No. 62/222,098, titled "Systems and Methods for Managing Mobility in a Network of Moving Things," filed on Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Application Ser. No. 62/222,121, titled "Systems and Methods for Managing Connectivity a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Application Ser. No. 62/222,135, titled "Systems and Methods for Collecting Sensor Data in a Network of Moving Things," filed on Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Application Ser. No. 62/222,145, titled "Systems and Methods for Interfacing with a Network of Moving Things," filed on Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Application Ser. No. 62/222,150, titled "Systems and Methods for Interfacing with a User of a Network of Moving Things," filed on Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Application Ser. No. 62/222,168, titled "Systems and Methods for Data Storage and Processing for a Network of Moving Things," filed on Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Application Ser. No. 62/222,183, titled "Systems and Methods for Vehicle Traffic Management in a Network of Moving Things," filed on Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Application Ser. No. 62/222,186, titled "Systems and Methods for Environmental Management in a Network of Moving Things," filed on Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Application Ser. No. 62/222,190, titled "Systems and Methods for Port Management in a Network of Moving Things," filed on Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Application Ser. No. 62/244,828, titled "Utilizing Historical Data to Correct GPS Data in a Network of Moving Things," filed on Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Application Ser. No. 62/244,930, titled "Using Anchors to Correct GPS Data in a Network of Moving Things," filed on Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Application Ser. No. 62/246,368, titled "Systems and Methods for Inter-Application Communication in a Network of Moving Things," filed on Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Application Ser. No. 62/246,372, titled "Systems and Methods for Probing and Validating Communication in a Network of Moving Things," filed on Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Application Ser. No. 62/250,544, titled "Adaptive Rate Control for Vehicular Networks," filed on Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Application Ser. No. 62/273,878, titled "Systems and Methods for Reconfiguring and Adapting Hardware in a Network of Moving Things," filed on Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Application Ser. No. 62/253,249, titled "Systems and Methods for Optimizing Data Gathering in a Network of Moving Things," filed on Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Application Ser. No. 62/257,421, titled "Systems and Methods for Delay Tolerant Networking in a Network of Moving Things," filed on Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Application Ser. No. 62/265,267, titled "Systems and Methods for Improving Coverage and Throughput of Mobile Access Points in a Network of Moving Things," filed on Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Application Ser. No. 62/270,858, titled "Channel Coordination in a Network of Moving Things," filed on Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Application Ser. No. 62/257,854, titled "Systems and Methods for Network Coded Mesh Networking in a Network of Moving Things," filed on Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Application Ser. No. 62/260,749, titled "Systems and Methods for Improving Fixed Access Point Coverage in a Network of Moving Things," filed on Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Application Ser. No. 62/273,715, titled "Systems and Methods for Managing Mobility Controllers and Their Network Interactions in a Network of Moving Things," filed on Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Application Ser. No. 62/281,432, titled "Systems and Methods for Managing and Triggering Handovers of Mobile Access Points in a Network of Moving Things," filed on Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Application Ser. No. 62/268,188, titled "Captive Portal-related Control and Management in a Network of Moving Things," filed on Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Application Ser. No. 62/270,678, titled "Systems and Methods to Extrapolate High-Value Data from a Network of Moving Things," filed on Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Application Ser. No. 62/272,750, titled "Systems and Methods for Remote Software Update and Distribution in a Network of Moving Things," filed on Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Application Ser. No. 62/278,662, titled "Systems and Methods for Remote Configuration Update and Distribution in a Network of Moving Things," filed on Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Application Ser. No. 62/286,243, titled "Systems and Methods for Adapting a Network of Moving Things Based on User Feedback," filed on Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Application Ser. No. 62/286,515, titled "Systems and Methods for Self-Initialization and Automated Bootstrapping of Mobile Access Points in a Network of Moving Things," filed on Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Application Ser. No. 62/295,602, titled "Systems and Methods for Power Management in a Network of Moving Things," filed on Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Application Ser. No. 62/299,269, titled "Systems and Methods for Automating and Easing the Installation and Setup of the Infrastructure Supporting a Network of Moving Things," filed on Feb. 24, 2016, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system for testing a node of a network of moving things comprising a plurality of nodes, the system comprising:
   one or more processors operably coupled to at least one storage of the node for storing instructions executable by the one or more processors and to a plurality of communication interfaces, the one or more processors operable to, at least:
      initiate execution of each of a plurality of software applications resident in the at least one storage;

receive a first message from a first software application of the plurality of software applications, wherein the first message is directed to a first communication interface of the plurality of communications interfaces;

in response to receipt of the first message,
send the first message to the first communication interface; and
if the plurality of software applications comprises a particular software application, send a second message representative of the first message to the particular software application;

receive a third message from a second communication interface of the plurality of communication interfaces, wherein the third message is directed to a second software application of the plurality of software applications;

in response to the receipt of the third message,
send the third message to the second software application, and
if the plurality of software applications comprises the particular software application, send a fourth message representative of the third message to the particular software application; and if a fifth message directed to a designated software application of the plurality of software applications or directed to a designated communication interface of the plurality of communication interfaces is received from the particular software application, send the fifth message to the designated software application or the designated communication interface, wherein:
the particular software application sends one or more messages to software applications of the plurality of software applications according to a specification for testing the node,
at least one of the one or more processors is configured to determine test results for the node based on monitoring messages and comparing the monitored messages to the specification for testing the node, and
the node is configured to communicate with at least one other electronic device via one or both of wired and wireless communication.

2. The system according to claim 1, wherein the plurality of communication interfaces comprises a receiver of radio frequency signals from satellites of a global navigation satellite system and a radio frequency wireless communication interface for communicating directly with other nodes of the plurality of nodes.

3. The system according to claim 1, wherein the plurality of communication interfaces comprises a communication interface configured to directly communicatively couple with a network used in a vehicle to communicate vehicle operational parameters.

4. The system according to claim 1, wherein the plurality of communication interfaces comprises a communication interface configured to communicate with a system of an autonomous vehicle.

5. The system according to claim 1, wherein the plurality of software applications comprises a software application that monitors one or more characteristics of an atmospheric environment surrounding a vehicle carrying the node.

6. The system according to claim 1, wherein the plurality of software applications comprises a software application that provides Internet access to one or more wireless-enabled end-user devices via a wireless communication interface of the node.

7. The system according to claim 1, wherein the particular software application transmits information received from the first message or the third message to a cloud-based system that is a source of the specification for testing the node.

8. A method of operating a node of a network of moving things comprising a plurality of nodes, the method comprising:

initiating execution of each of a plurality of software applications resident in at least one storage of the node;
receiving a first message from a first software application of the plurality of software applications, wherein the first message is directed to a first communication interface of a plurality of communications interfaces of the node;

in response to receipt of the first message,
sending the first message to the first communication interface, and
if the plurality of software applications comprises a particular software application, sending a second message representative of the first message to the particular software application;

receiving a third message from a second communication interface of the plurality of communication interfaces, wherein the third message is directed to a second software application of the plurality of software applications;

in response to the receipt of the third message,
sending the third message to the second software application, and
if the plurality of software applications comprises the particular software application, sending a fourth message representative of the third message to the particular software application;

if a fifth message directed to a designated software application of the plurality of software applications or directed to a designated communication interface of the plurality of communication interfaces is received from the particular software application, sending the fifth message to the designated software application or the designated communication interface; and determining by at least one of the one or more processors test results for the node based on monitoring messages and comparing the monitored messages to a specification for testing the node, wherein:
the particular software application sends one or more messages to software applications of the plurality of software applications according to the specification for testing the node, and
the node is configured to communicate with at least one other electronic device via one or both of wired and wireless communication.

9. The method according to claim 8, wherein the plurality of communication interfaces comprises a receiver of radio frequency signals from satellites of a global navigation satellite system and a radio frequency wireless communication interface for communicating directly with other nodes of the plurality of nodes.

10. The method according to claim 8, wherein the plurality of communication interfaces comprises a communication interface configured to directly communicatively couple with a network used in a vehicle to communicate vehicle operational parameters.

11. The method according to claim 8, wherein the plurality of communication interfaces comprises a communication interface configured to communicate with a system of an autonomous vehicle.

12. The method according to claim 8, wherein the plurality of software applications comprises a software application that monitors one or more characteristics of an atmospheric environment surrounding a vehicle carrying the node.

13. The method according to claim 8, wherein the plurality of software applications comprises a software application that provides Internet access to one or more wireless-enabled end-user devices via a wireless communication interface of the node.

14. The method according to claim 8, wherein the particular software application transmits information received from the first message or the third message to a cloud-based system that is a source of the specification for testing the node.

15. A non-transitory computer-readable medium on which is stored a plurality of code sections, each code section comprising a plurality of instructions executable by one or more processors, the instructions causing the one or more processors to perform the actions of a method of operating a node of a network of moving things comprising a plurality of nodes, the steps of the method comprising:
    initiating execution of each of a plurality of software applications resident in at least one storage of the node;
    receiving a first message from a first software application of the plurality of software applications, wherein the first message is directed to a first communication interface of a plurality of communications interfaces of the node;
    in response to receipt of the first message,
        sending the first message to the first communication interface, and
        if the plurality of software applications comprises a particular software application, sending a second message representative of the first message to the particular software application;
    receiving a third message from a second communication interface of the plurality of communication interfaces, wherein the third message is directed to a second software application of the plurality of software applications;
    in response to the receipt of the second message,
        sending the third message to the second software application, and
        if the plurality of software applications comprises the particular software application, sending a fourth message representative of the third message to the particular software application;
    if a fifth message directed to a designated software application of the plurality of software applications or directed to a designated communication interface of the plurality of communication interfaces is received from the particular software application, sending the fifth message to the designated software application or the designated communication interface; and
    determining by at least one of the one or more processors test results for the node based on monitoring messages and comparing the monitored messages to a specification for testing the node,
    wherein:
        the particular software application sends one or more messages to software applications of the plurality of software applications according to the specification for testing the node, and
        the node is configured to communicate with at least one other electronic device via one or both of wired and wireless communication.

16. The non-transitory computer-readable medium according to claim 15, wherein the plurality of communication interfaces comprises a receiver of radio frequency signals from satellites of a global navigation satellite system and a radio frequency wireless communication interface for communicating directly with other nodes of the plurality of nodes.

17. The non-transitory computer-readable medium according to claim 15, wherein the plurality of communication interfaces comprises a communication interface configured to directly communicatively couple with a network used in a vehicle to communicate vehicle operational parameters.

18. The non-transitory computer-readable medium according to claim 15, wherein the plurality of communication interfaces comprises a communication interface configured to communicate with a system of an autonomous vehicle.

19. The non-transitory computer-readable medium according to claim 15, wherein the plurality of software applications comprises a software application that monitors one or more characteristics of an atmospheric environment surrounding a vehicle carrying the node.

20. The non-transitory computer-readable medium according to claim 15, wherein the plurality of software applications comprises a software application that provides Internet access to one or more wireless-enabled end-user devices via a wireless communication interface of the node.

21. The non-transitory computer-readable medium according to claim 15, wherein the particular software application transmits information received from the first message or the third message to a cloud-based system that is a source of the specification for testing the node.

* * * * *